(12) United States Patent
Popmintchev et al.

(10) Patent No.: US 9,627,844 B2
(45) Date of Patent: Apr. 18, 2017

(54) GENERATION OF VUV, EUV, AND X-RAY LIGHT USING VUV-UV-VIS LASERS

(71) Applicant: The Regents of the University of Colorado, a body corporate, Denver, CO (US)

(72) Inventors: Tenio V Popmintchev, Boulder, CO (US); Dimitar V Popmintchev, Boulder, CO (US); Margaret M Murnane, Boulder, CO (US); Henry C Kapteyn, Boulder, CO (US)

(73) Assignee: The Regents of the University of Colorado, a body, Boulder, CO (US)

( * ) Notice: Subject to any disclaimer, the term of this patent is extended or adjusted under 35 U.S.C. 154(b) by 0 days.

(21) Appl. No.: 15/201,736

(22) Filed: Jul. 5, 2016

(65) Prior Publication Data

US 2016/0315442 A1    Oct. 27, 2016

Related U.S. Application Data

(63) Continuation-in-part of application No. 14/477,853, filed on Sep. 4, 2014, now abandoned.

(60) Provisional application No. 61/873,794, filed on Sep. 4, 2013.

(51) Int. Cl.
*H01S 3/104* (2006.01)
*H01S 4/00* (2006.01)
*H05G 2/00* (2006.01)
*G02F 1/35* (2006.01)
*G02F 1/355* (2006.01)

(52) U.S. Cl.
CPC ............... *H01S 4/00* (2013.01); *G02F 1/353* (2013.01); *G02F 1/355* (2013.01); *G02F 1/3544* (2013.01); *H05G 2/00* (2013.01); *G02F 2001/354* (2013.01)

(58) Field of Classification Search
CPC .. H01S 3/03; H01S 3/10; H01S 3/109; H05G 2/00; G02F 1/35
USPC ........................................ 372/22, 55, 61, 21
See application file for complete search history.

(56) References Cited

U.S. PATENT DOCUMENTS 8,462,824 B2 *  6/2013  Popmintchev .......... G02F 1/353
                                                             372/21

* cited by examiner

*Primary Examiner* — Tuan Nguyen
(74) *Attorney, Agent, or Firm* — Macheledt Bales LLP; Jennifer L. Bales

(57) ABSTRACT

A method for extending and enhancing bright coherent high-order harmonic generation into the VUV-EUV-X-ray regions of the spectrum involves a way of accomplishing phase matching or effective phase matching of extreme upconversion of laser light at high conversion efficiency, approaching $10^{-3}$ in some spectral regions, and at significantly higher photon energies in a waveguide geometry, in a self-guiding geometry, a gas cell, or a loosely focusing geometry, containing nonlinear medium. The extension and enhancement of the coherent VUV, EUV, X-ray emission to high photon energies relies on using VUV-UV-VIS lasers of shorter wavelength. This leads to enhancement of macroscopic phase matching parameters due to stronger contribution of linear and nonlinear dispersion of both atoms and ions, combined with a strong microscopic single-atom yield.

18 Claims, 25 Drawing Sheets

Laser Propagation Geometry

Guided beam geometry

Loose-focus geometry

Laser beam self-confining in space and time

Optimized driving laser phase velocity (optimized index of refraction)
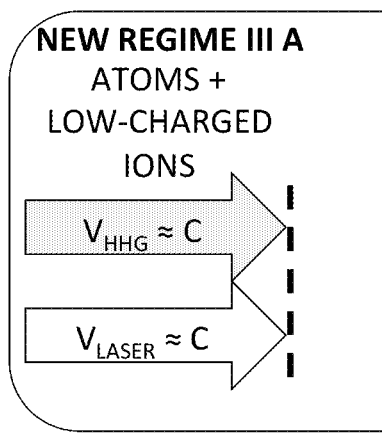
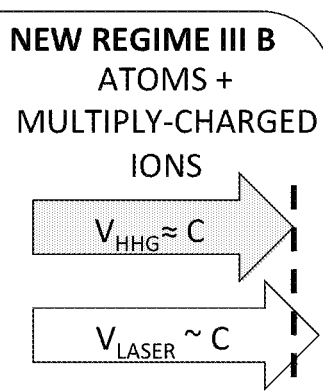
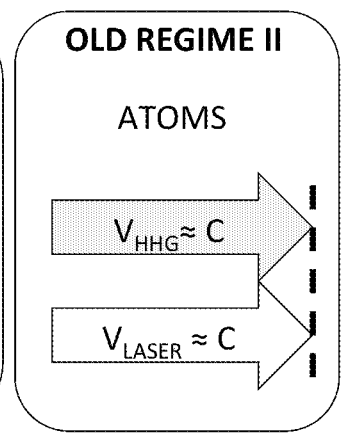
Figure 4A　　　　　Figure 4B　　　　　Figure 4C
　　　　　　　　　　　　　　　　　　　　　　(Prior Art)
Resulting laser group velocity
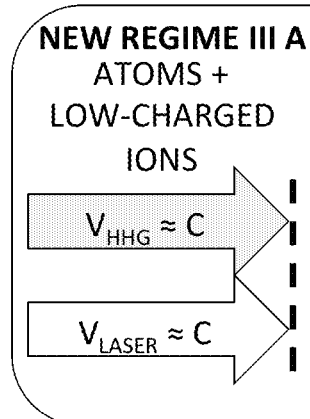
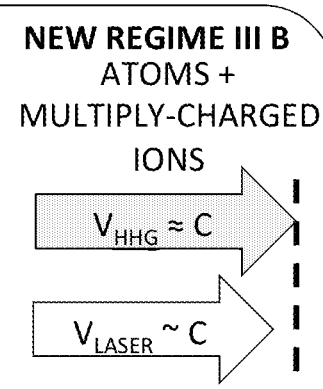
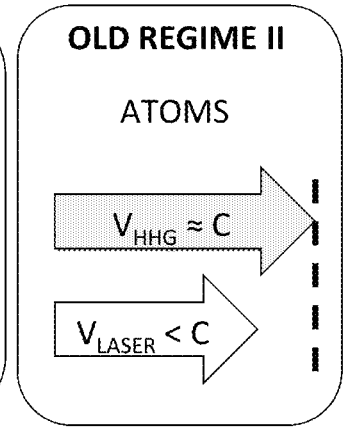
Figure 5A　　　　　Figure 5B　　　　　Figure 5C
　　　　　　　　　　　　　　　　　　　　　　(Prior Art)

Optimizing driving laser phase velocity

Pulse Shapes
(Old Regime II)
Driving Laser Pulse
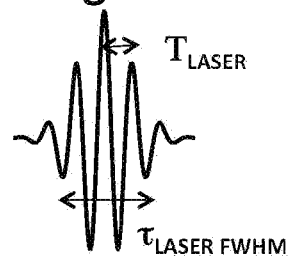
Figure 11A
(Prior Art)
Figure 11B (Prior Art)
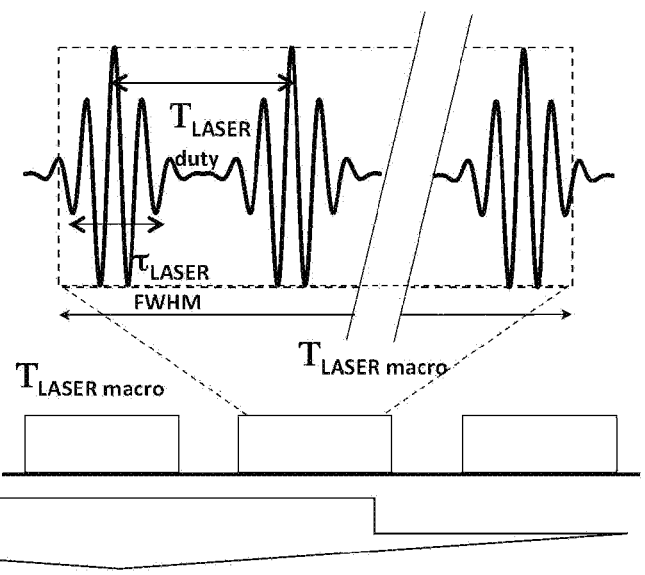
X-ray Pulses
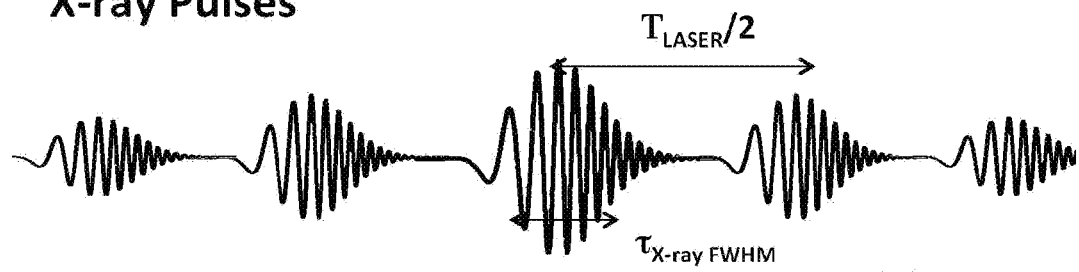
Figure 11C
(Prior Art)
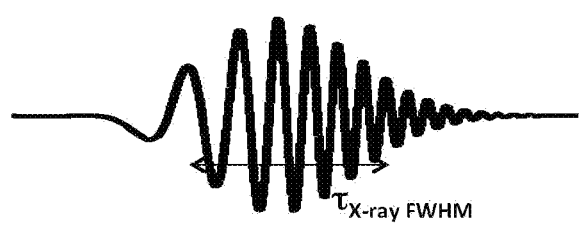
Figure 11D
(Prior Art)

Pulse Shapes
(New Regime III)

Driving Laser Pulses

X-ray pulses

Efficient HHG
(New Regime III A and B vs Old Regime II)

Efficient UV-Driven HHG
(New Regime III B)

ATOMS + MULTIPLY-CHARGED IONS
(VERY HIGH LASER INTENSITY RANGE)

Efficient UV-Driven HHG
(New Regime III A)

ATOMS + LOW-CHARGED IONS
(HIGH LASER INTENSITY RANGE)
Theoretical
Phase Matched Yield

Isolated Harmonics
(New Regime III A and B)

Phase Matching Temporal Window

GENERATION OF VUV, EUV, AND X-RAY LIGHT USING VUV-UV-VIS LASERS

U.S. Pat. App. No. 61/873,794, filed 4 Sep. 2013, is incorporated herein by reference. U.S. Pat. No. 6,151,155, filed 29 Jul., 1998 and issued 21 Nov. 2000 is incorporated herein by reference. U.S. Pat. No. 8,462,824, filed 22 Apr. 2010 and issued 11 Jun. 2013 is incorporated herein by reference.

BACKGROUND OF THE INVENTION

Field of the Invention

The present invention relates to extending and enhancing bright coherent high-order harmonic generation into the VUV-EUV-X-ray regions of the spectrum. In particular, the present invention relates to phase matched and effectively phase matched generation of VUV, EUV, and X-ray light using VUV-UV-VIS laser pulses.

Discussion of Related Art

This invention is related to three previously demonstrated techniques, implemented in a novel regime of parameters that contrasts with the parameters of all techniques demonstrated to date:

The first related technique is developed by some of the inventors in the current application and includes a method and device for phase matching the generation of high harmonic radiation in a waveguide, which is patented (U.S. Pat. No. 6,151,155, incorporated herein by reference). Using this technique and, typically, a Ti:Sapphire laser of a wavelength of 0.8 μm to drive the high harmonic process, full phase matching of the process can extend to EUV—soft x-ray wavelengths of about 10 nm. Therefore, in practice, the output flux produced is significant enough to enable applications using light with wavelength no shorter than 10 nm. In this scheme, the generation of soft x-rays of shorter wavelengths requires an increase in driving laser intensity. However, scaling of macroscopic parameters (see typical values in Table 1, Regime I) does not allow for extending the phase matching of the process to shorter x-ray wavelengths, at the same time. Higher intensities result in too much ionization of the gas, degrading the phase matching conditions and limiting both the flux and the coherence of the generated light. Emission at wavelengths shorter than ~10 nm can be observed but it originates from a region of the nonlinear medium of short length, and.or with a low density of emitters, and in the presence of a large number of free electrons All these factors dramatically decreasing the x-ray flux to levels not useful for applications. Typically, the emission originates from a short coherence length of <1-100 μm and both atoms and ions can emit harmonics of very high photon energies. However, due to the very short coherence length—that can be much shorter than the medium absorption length and medium length—the emission from ions in the high photon energy range is 3-4 orders of magnitude lower than the emission from atoms limited only within the low photon energy range.

The second technique related to this invention is the idea that a longer-wavelength driving laser can be used to generate X-rays of shorter wavelength. This idea originates from the simple theoretical model that well describes the high-order harmonic generation process (Kulander; Corkum). However, subsequent theory predicted that using longer laser wavelengths $\lambda_{Laser}$ to generate shorter X-ray wavelengths comes at a cost of a significantly lower single-atom yield (i.e. the amount of X-ray light generated for each atom in the nonlinear medium, predicted to scales as $\sim\lambda_{Laser}^{-3}$). Initial attempts to generate shorter-wavelength X-rays using laser wavelengths as long as 1.5 μm (Shan, PRA 65, 011804 (2001)) supported this prediction of diminishing flux. This and later experiments were done in a gas jet geometry using macroscopic parameter regime similar to the well known Regime I (a low gas pressure (on the order of tens to hundreds of torr) in the interaction region, and a short propagation length (on the order of 0.1-1 mm)), and did not observe flux that would make their approach usable as a general purpose coherent X-ray source. Furthermore, more recent quantum calculations suggested that the single-atom yield drops even more dramatically with laser wavelengths and scales as $\lambda_{Laser}^{-5.5}$. The ideas in this approach imply that shorter-wavelength lasers may give rise to significantly bright emission from a single emitter limited to the long-wavelength HHG range, however, the macroscopic optimization of the HHG upconversion has not been considered neither for shorter-wavelength nor for longer-wavelength lasers.

To remedy the low conversion efficiency observed in the above-mentioned work, in past work we developed a third technique—a method for optimization of phase matched conversion of mid-infrared laser light into the X-ray region of the spectrum. By using high-pressure medium and a loose-focusing geometry. This approach, devised by many of the same inventors as the current invention, is described is described in Popmintchev et al., U.S. Pat. No. 8,462,824 (incorporated herein by reference). In contrast with the previously discussed scheme in Regime I, the inventors demonstrated that both the X-ray radiation from a single atom, as well as phase matched conversion of this process, can be extended to the generation of much shorter wavelengths. In order to produce significant X-ray flux, this techniques requires a regime of parameters (see optimal parameters in Table 1, Regime II), contrasting with the parameters in the scheme illustrated in Regime I using Ti:Sapphire lasers. This phase matching scaling to shorter wavelengths is achieved through increasing the laser wavelength while slightly decreasing the laser intensity. Second, a nonlinear medium of much higher density (note the optimal gas pressure of multiple atmospheres) is required when using longer wavelength lasers, to allow the X-ray beam intensity to build to optimum conversion efficiency. This technique employs nonlinear media that is only barely ionized, with many neutral atoms still remaining after the generation process terminates. Carefully designed macroscopic parameters lead to coherent build of the X-ray signal over extended optimal medium length that can be a significantly long (cm or longer). The result is a fully spatially and temporally coherent, well directed, X-ray beam. Tunability of this broadband X-ray source is achieved by changing the laser wavelength in the IR region and by changing the intensity and/or the medium, plus adjusting the medium parameters. The tunability range can be from hundreds of nm to sub-nm. Helium gas is a good candidate as a nonlinear medium usable for a tunable source over a broad range of X-ray wavelengths. Other noble gases can also be used in some regions of the spectrum. Finally, the method for optimization in Regime II implies that using shorter-wavelength laser can generate bright phase-matched HHG from partially ionized atoms in the long-wavelength VUV range.

A need remains in the art for using shorter wavelength driving lasers in the VUV-UV-VIS region of the spectrum to benefit from the strong single-atom yield, while simultaneously extending this upconversion in an efficient way well into the shorter wavelength VUV, EUV, and X-ray regions.

SUMMARY OF THE INVENTION

It is an object of the present invention to use shorter wavelength driving lasers in the VUV-UV-VIS region of the spectrum for phase matched generation and effectively phase matched generation (defined herein as generation with optimized phase mismatch) of coherent VUV, EUV, and X-ray light.

Embodiments extend and enhance bright coherent high-order harmonic generation into the VUV-EUV-X-ray regions of the spectrum. This method involves a previously-unrealized, straightforward way of achieving relatively high upconversion of laser light to VUV, EUV, and X-ray light at conversion efficiency that in some cases can approach $10^{-3}$. This extension of HHG relies on using VUV-UV-VIS lasers of shorter wavelength to drive the upconversion process, and employing focused intensities of these lasers that cause substantial ionization of the nonlinear medium. We show that the use of short-wavelength driving lasers in a properly designed loose-focus, waveguide geometry, or laser self-guiding geometry over an extended distance that is similar of greater than a coherence length can unexpectedly lead to a non-obvious, favorable enhancement of macroscopic phase matching parameters due to stronger contribution of linear and nonlinear dispersion of both atoms and multiply charged ions. The resulting strong macroscopic yield of VUV-to-EUV-to-X-ray photons is combined with the significantly increased microscopic single-atom yield that is inherent to driving HHG with shorter wavelength lasers. In a properly designed and implemented geometry, well-directed, ultrafast VUV-EUV-X-ray beams of full temporal and spatial coherence can exhibit a nearly quasi-monochromatic spectrum that consists of a relatively small number of well-separated harmonics, or a single quasi-monochromatic harmonic. In the time domain, the high harmonic light can be an isolated pulse, a train of pulses whose separation decreases as we decrease the driving wavelength, or this train of pulses may even merge into a single relatively long-duration pulse that corresponds to an isolated single harmonic. The generated harmonics are also semi-continuously tunable through varying the laser wavelength and/or changing the nonlinear medium.

Embodiments of the present invention use, first, shorter wavelength driving lasers in the VUV-UV-VIS region of the spectrum (see Regime III in Table 1), in contrast to the work of U.S. Pat. No. 8,462,824. Second, simultaneously with decreasing the laser wavelength the present invention significantly increases the laser intensity by few orders of magnitude to the range of $10^{15}$-$10^{16}$ W/cm$^2$ or greater. A fundamentally new regime of HHG can be accessed when laser wavelength, peak power, and focusing geometry are properly optimized. The illumination at this intensity results in relatively strong ionization of the nonlinear medium, often creating multiply charged ions (e.g. $Ar^+$, $Ar^{2+}$, $Ar^{3+}$, $Ar^{4+}$, $Ar^{5+}$, etc). Furthermore, using shorter VUV-UV-VIS laser means that both the linear and nonlinear index of refraction of the neutral atomic and ionic nonlinear medium are significantly large since these laser wavelengths approach the UV resonances of atoms. Finally, we extend the interaction length with the nonlinear medium where such high laser intensities are maintained by using loose-focusing, waveguiding geometry, or laser self-guiding geometry to a length that is optimal for efficient HHG upconversion.

The present invention is generally separated into two regimes: Regime IIIA of high laser intensity where full phase matching balance can be achieved, and Regime IIIB where there is finite phase mismatch but it is strongly mitigated.

BRIEF DESCRIPTION OF THE DRAWINGS

FIG. 4A is schematic flow diagram illustrating phase velocity matching of the driving laser light and the generated light in Regime IIIA according to the present invention.

FIG. 4B is a schematic flow diagram showing the reduced phase velocity mismatch in Regime IIIB in the present invention.

FIG. 4C (Prior Art) is a schematic flow diagram showing phase velocity matching with Regime II.

FIG. 5A is a schematic flow diagram illustrating resulting minimal group velocity mismatch of the driving laser light and the generated light in Regime IIIA according to the present invention.

FIG. 5B is schematic flow diagram illustrating resulting reduced group velocity mismatch in Regime IIIB according to the present invention.

FIG. 5C (Prior Art) is a schematic flow diagram illustrating resulting strong group velocity mismatch of the driving laser light and the generated light in prior art Regime II.

FIGS. 11A-D are time domain diagrams illustrating input laser pulse shapes and output HHG pulse shapes according to prior art Regime II.

DETAILED DESCRIPTION OF THE INVENTION

Figure 1A:
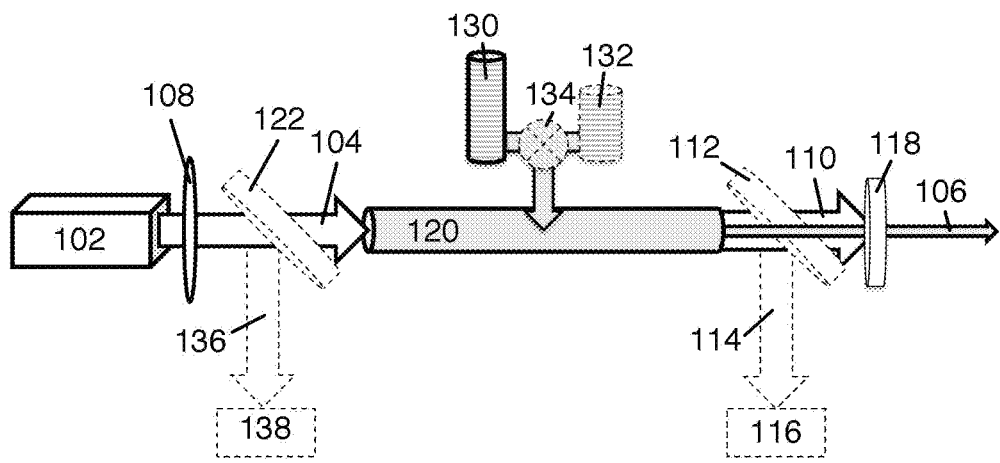
FIG. 1A is a schematic block diagram illustrating apparatus for phase-matched and effectively phase-matched high-order harmonic generation (HHG) in the VUV-EUV-X-ray regions of the spectrum according to the present invention.

Prior to this invention it was widely accepted that phase matching in extreme frequency upconversion in highly ionized plasma couldn't be obtained due to the fact that free electron dispersion dominates the process and no longer is balanced by the neutral atom dispersion. Here, we demonstrate that it is possible to achieve such balance or strongly mitigate the phase mismatch.

Using shorter wavelength VUV-UV-VIS lasers to drive the HHG process means that both the linear and nonlinear index of refraction of the neutral atomic nonlinear medium are significant since these laser wavelengths approach the UV resonances of atoms. As a result, the optimal laser intensity is significantly higher which further increases the nonlinear dispersion contribution which increases with laser intensity $\sim n_2^{(atom)} * I_L(time)$. Next, linear and nonlinear indices of refraction of ions can be nearly as large as those of neutral atoms, and will increase as we use shorter driving laser wavelengths. Furthermore, since highly charged ions are created later in the laser pulse when the laser intensity is higher, the nonlinear dispersion term can be also significant because of the higher laser intensity $\sim n_2^{(ion)} * I_L(time)$. Thus there is significant dispersion contribution both from neutral atoms and ions. This is balanced against a free electron dispersion term of opposite sign, and of greatly diminished magnitude compared with its value at longer infrared wavelengths. Furthermore, the coherence length of the upconversion process to first approximation (assuming dominant plasma dispersion) scales approximately as $L_{coh} \sim 1/(q^* I_{Laser})$ with q being the harmonic order, and which for a given X-ray energy is smaller if a shorter-wavelength driver is used. Combined, these macroscopic propagation factors allow for significant coherent signal buildup for X-ray HHG even in the case of very high laser intensity resulting in very high limiting ionization levels that in some cases can be >100%.

When the length of the nonlinear medium, the absorption depth of the medium to the generated X-rays, and the coherence length all reach comparable values, HHG upconversion is effectively phase matched. Both these scaling considerations as well as experimental data suggest that optimization of the interaction geometry can approach this ideal in the case of short-wavelength driving lasers, and very high intensity and corresponding very high photon energies.

Furthermore, as mentioned previously the X-ray emission yield per atom also increases strongly with the use of shorter drive laser wavelengths. This results in shorter excursion distance of the rescattering electron. Due to lower quantum diffusion, the recombination probability is significantly increased, with yield from a single atom that scales stronger than $\sim I_{Laser}^{-5.5}$. TDSE calculations show that the single-atom yield under phase matched illumination scales as $\sim I_{Laser}^{-7.5}$ or even faster since much higher laser intensities compared to Regime II are allowed. Thus, regardless of having a finite coherence length the conversion efficiency can be significantly high compared to the prior art.

Table 1 shows a comparison of practical parameters when scaling the HHG process towards generating shorter X-ray wavelengths, using near-IR 0.8 mm driving laser (Regime I—prior art), longer-wavelength mid-IR driving lasers (Regime II—prior art), and shorter-wavelength VUV-UV-VIS lasers (Regime III—present invention).

TABLE 1

| | Regime I (prior art) (non-phase-matched) $I_L = 0.8$ mm = const & $I_L$ increases | Regime II (prior art) (phase-matched) $I_L$ increases & $I_L$ decreases (slightly) | Regime III (present invention) (phase-matched) $I_L$ decreases & $I_L$ increases (significantly) |
|---|---|---|---|
| Peak Laser Intensity [W/cm²] | Increases significantly from $10^{13}$-$10^{14}$ to >$10^{16}$. | Decreases from $10^{14}$-$10^{15}$ to $10^{14}$ under phase matching conditions. | Increases significantly from $10^{14}$ to >$10^{16}$-$10^{17}$ under phase matching conditions or effectively phase matching conditions. |
| Ionization Level of the Medium | Increases from ~10% to >>200% Highly ionized or multiply-ionized nonlinear medium. | Low and decreases from ~10% to ~0.001%. Gently ionized nonlinear medium. | Increases from ~10% to >>600% Highly ionized or multiply-ionized nonlinear medium. |
| Emitters of coherent light | Ions generated by the driving laser or pre-ionized medium. Poor emission from ions. | Atoms gently ionized by the driving laser. Emission from atoms only. | Highly charged ions (ion states of +1 to >+6) generated by the driving laser or using pre-ionized medium. Very strong emission from both atoms and ions. |
| Nonlinear Medium Density | Decreases from ~10-500 torr to ~1 torr. Range: fraction of atmosphere. | Increases from ~10-500 torr to >>10000 torr. Range: multi-atmosphere. | Increases from ~1-10 torr to >1000 torr. Range: fraction of atmosphere to >atmosphere. |
| Index of refraction of the medium at the driving laser wavelength | Low linear and nonlinear index of refraction per neutral atom or ion. | Very low linear and nonlinear index of refraction per neutral atom. | Very large linear and nonlinear index of refraction per neutral atom and ion. |
| Useful Nonlinear Medium Length | Decreases from mm-cm to mm. | Increases from mm-cm to m. | Increases from mm to cm |
| Density of the Ionized Electrons | Increases from >$10^{17}$ to >>$10^{18}$ cm$^{-3}$. | Constant: ~>$10^{17}$ cm$^{-3}$. | Increases from >$10^{17}$ to >>$10^{18}$ cm$^{-3}$. |
| Conversion efficiency | $10^{-5}$ to <$10^{-11}$ | $10^{-5}$ to <$10^{-7}$-$10^{-8}$ | $10^{-3}$ to <$10^{-5}$-$10^{-6}$ |
| Phase matching dispersion balance | Plasma dispersion dominates - no dispersion balance. | Neutral atom dispersion balances low plasma dispersion. | Large neutral atom + low/multiply-charged ion dispersions counteract large plasma dispersion. |
| VUV-EUV-X-ray Flux | Rapidly decreasing at shorter X-ray wavelengths. Non-phase matched addition of X-ray fields. | Same or increasing at shorter X-ray wavelengths. Phase-matched addition of X-ray fields. | Comparable flux from atoms and ions at longer VUV-EUV and shorter X-ray wavelengths. Phase matched and effectively phase matched addition of VUV/EUV/X-ray fields or very long coherence length compared to absorption length/medium length. |

FIG. 1 is a schematic block diagram illustrating apparatus for phase-matched and effectively phase-matched high-order harmonic generation into the VUV-EUV-X-ray regions of the spectrum according to the present invention.

The embodiment of FIG. 1 might utilize a driving laser source 102 providing, for example, a 0.4 μm pulse, a 0.27 μm pulse or a 0.2 μm pulse 102 with a peak intensity of >3×$10^{14}$ W/cm² and can exceed $10^{15}$ W/cm²-$10^{16}$ W/cm². For example source 102 might be a laser or a chirped pulse amplifier (CPA) directly producing light at the desired driving wavelength 104, a laser in conjunction with an optical parametric amplifier (OPA) for converting the laser light to the desired driving pulse 104 wavelength, or an optical parametric chirped pulse amplifier (OPCPA), or an excimer laser, or a harmonic beam of a Ti:Sapp laser or of a Ti:Sapp CPA/OPCPA or other solid-state laser or of OPA or OPCPA system (i.e. a 2nd, 3rd, 4th, 5th, etc. harmonic that is at the desired wavelength 104), or for example a VUV-UV-VIS free electron laser (FEL) or a harmonic of an IR FEL. The driving laser might be also a laser beam generated through frequency mixing of two or more laser beams of different frequency in a waveguide or a gas cell. The nonlinear medium 120 is highly ionized, for example from about 1-10% to above 600%. The pressure of the medium can be 10-1000 torr to multi-atmosphere. The density of the ionized electrons can be $>10^{17}$ to $>>10^{18}$ cm$^{-3}$. This results in a useful nonlinear medium length $L_{medium}$ of centimeters to sub 10-100 mm. The phase-matched addition of the HHG fields means that flux does not vary strongly with wavelength.

The laser source 102 energy, wavelength, and pulse 104 duration are selected to maintain phase matched or effectively phase matched HHG 106 generation. Driving source 102 may produce ultrashort driving pulses at any repetition rate or long "macroscopic" pulses at any repetition rate with multiple driving pulses under the envelope.

Medium 130 or 132 might comprise atomic gases (for example, noble gases: helium, neon, argon, krypton, xenon, etc.) and mixtures, of molecular gasses (for example hydrogen gas) and mixtures of atomic and molecular gases (for example air, etc.). Gas mixing apparatus 134 is optional. In mixtures, phase matching and effective phase matching relies on the presence of a target that is less or non-ionized compared to the other species targets for a given peak laser intensity. Therefore, a mixture of targets with different ionization potentials may be desirable. Mixtures allow the less ionized medium to contribute to the neutral and ionic index of refraction. Therefore, higher laser intensity can be employed. As a result higher photon energies may be phase matched or effectively phase matched with further increase in HHG flux. Since the short wavelength driving laser can penetrate higher density plasma, the nonlinear medium may be liquid, or mixture of liquids, or for example solid state He, Ne, etc, such that at the maximum ionization level the critical plasma density at the driving laser wavelength is not exceeded (for example 50% of the critical plasma density is reached at a mean charge Z=1 for $H_2O$ and 0.16 mm laser, 67% of the critical plasma density is reached at a mean charge Z=1 for $SiO_2$ and 0.16 mm laser; 59% of the critical plasma density is reached at a mean charge Z=1 for solid $H_2$ and 0.16 mm laser).

Other optional features include a front mirror 122 for beam steering at the input to monitor beam diameter at the entrance of waveguide or gas cell 120. Laser beam 136 is coupled into monitoring equipment 138 in order to optimize waveguide mode coupling, to monitor and control beam pointing, as well as to monitor the laser peak intensity on target. Monitoring 138 may also monitor the input spectrum. Front mirror 122 may be removable.

Optional back mirror 112 selects beam 114 for monitoring equipment 116. Monitoring equipment 116 may image the beam diameter at the output or at certain propagation distance, may monitor and control beam pointing, may monitor the beam intensity at the output, and/or may monitor the output laser spectrum. Front mirror 112 may be removable or have a hole for transmission.

Figure 1B:
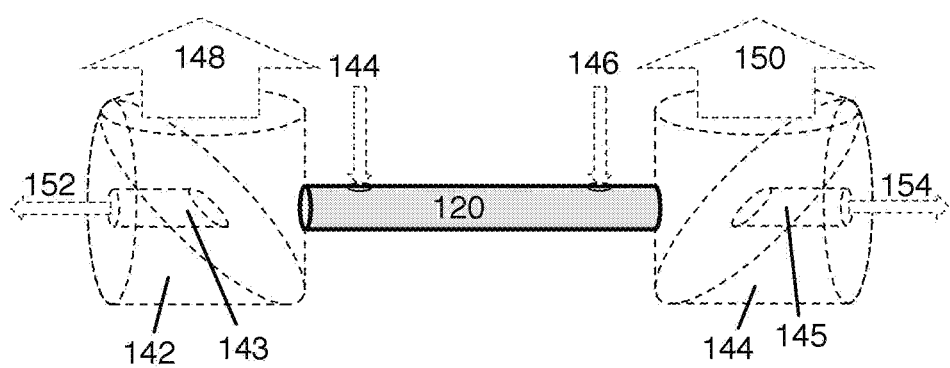
FIG. 1B is schematic block diagram showing injecting of a nonlinear medium in the interaction region and optional differential pumping to vacuum.

Optional differential pumping 142, 144 or several of them may be provided at input and output of waveguide or gas cell 120, as illustrated in FIG. 1B. In this embodiment, small diameter tubing is provided along the axis of the laser and HHG propagation, and the tubing restricts the gas flow for an embodiment where the nonlinear medium is in a gas phase, while allowing the driving laser and the generated light through. The gas flow resistance increases significantly with decreases in the diameter of the tubing and scales as $\sim D^{-4}$, where D is the diameter. The gas flow coming out of the region containing the nonlinear medium can preferentially be redirected towards a bigger diameter region of low resistance pumped by vacuum pumps and can be also additionally steered in this direction by inclined surfaces (e.g. 45 degrees in the example drawing).

Figure 2A:
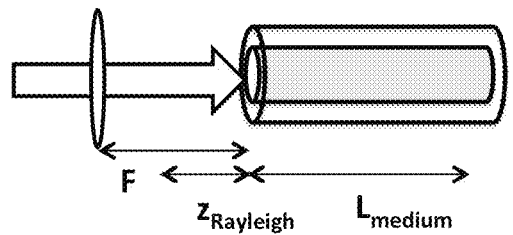
FIG. 2A is a schematic block diagram illustrating a guided beam geometry embodiment of the present invention.

FIG. 2A is a schematic block diagram illustrating a guided beam geometry embodiment of the present invention. This embodiment comprises a hollow waveguide (cylindrical or tapered) filled with a nonlinear medium. The laser beam 104 is focused to an optimal beam diameter relative to a selected waveguide diameter to couple to a desired waveguide mode or to minimize attenuation losses. The idea is to extend the region of high laser intensity, i.e. the Rayleigh range $Z_{Rayleigh}$, towards multiple Rayleigh ranges. This is of a significant importance to decrease the technical challenges with respect to the required laser technology having in mind that the optimal high laser intensities in some cases exceeds $>10^{15}$-$10^{16}$ W/cm$^2$. Also, this geometry can provide near plane wave propagation of the laser beam. Such uniform conditions may allow for a better collinear (effectively) phase-matched upconversion. The waveguide can also provide means to contain a gas with uniform pressure over extended distances and can also provide pressure-length products that are uniform or with predesigned gradients that are better controlled compared to a gas directly injected into a vacuum chamber.

Figure 2B:
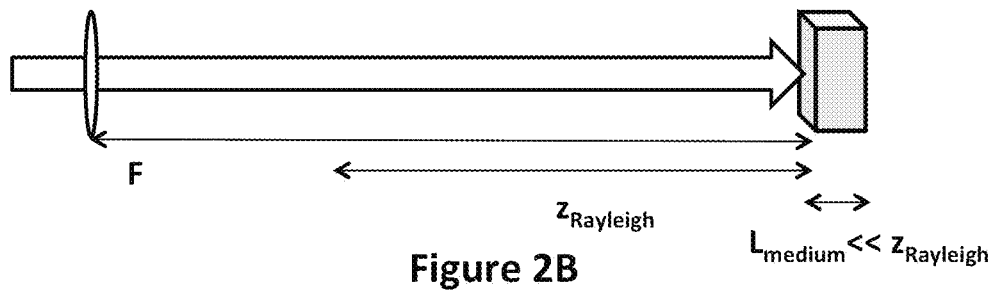
FIG. 2B is a schematic block diagram illustrating a loose-focusing geometry embodiment of the present invention.

FIG. 2B is a schematic block diagram illustrating a loose-focusing geometry embodiment of the present invention. In a loose-focus geometry the medium length can be much shorter than the region of high laser intensity, the Rayleigh range $Z_{Rayleigh}$. Thus, the interaction region is almost in a near plane wave propagation similar to propagation in a waveguide. The required optimal laser energy can be significantly larger.

Figure 2C:
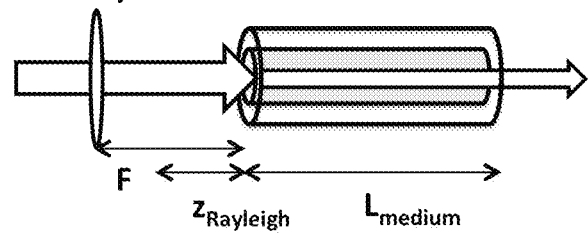
FIG. 2C is a schematic block diagram illustrating a laser self-guiding geometry embodiment of the present invention.

FIG. 2C is a schematic block diagram illustrating a laser self-guiding geometry embodiment of the present invention. A waveguiding geometry may also assist the formation of self-guided propagation of the laser beam. The laser beam can collapse to smaller diameter than that at the entrance of the waveguide and can propagate steadily after a certain distance, or can propagate at the same diameter regardless of plasma-induced defocusing. This is due to a balance between Kerr lens self-focusing and plasma-induced defocusing specific for a waveguide structure (i.e. different from a conventional filamentation effect in free space) and may coincide with a regime of nonlinear medium parameters and laser pulse parameters that are also optimal for efficient HHG upconversion. Such self-guiding in space, a stable propagation in space, may be also accompanied by a stable propagation of the laser pulse in time without any change in pulse duration or with a compression in pulse duration along the interaction distance.

FIGS. 3A-3D are schematic diagrams illustrating how the optimized VUV-EUV-X-ray intensity increases within the medium, as well as the parameters of the HHG scheme that depend on the driving laser wavelength and the HHG wavelength.

Figure 3A:
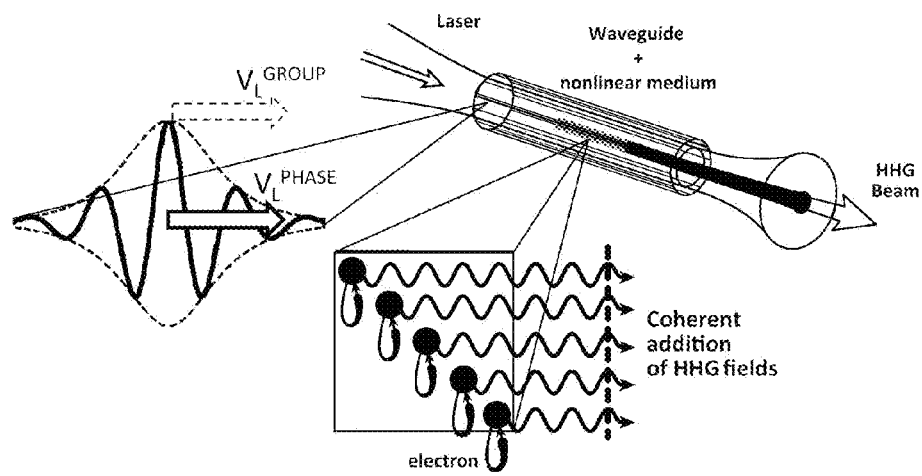
FIG. 3A is an isometric schematic block diagram illustrating interaction within a waveguide for strong, constructive, coherent build up of HHG light.

FIG. 3A is an isometric schematic block diagram illustrating interaction within a waveguide for a phase matched and effectively phase matched buildup of high-harmonic signal. FIG. 3A also shows the phase velocity and the resulting group velocity of the driving laser pulse associated with the propagation of the carrier wave and its envelope, respectively. In an ideal case, the phase velocities of the driving light and the generated light has to be matched while the group velocity mismatch has to be mitigated. FIG. 3A also shows interactions within the medium in the waveguide, wherein the harmonic fields are generated, and are added constructively over a finite interaction length.

Figure 3B:
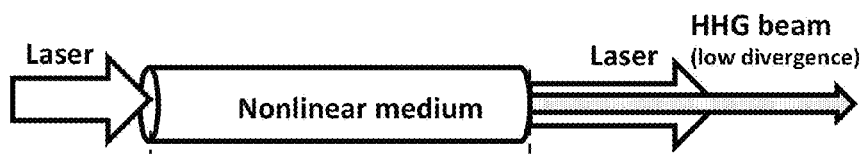
FIG. 3B is a side-view schematic block diagram illustrating how output pulse intensity increases and beam diverge decreases with phase matching or effective phase matching within the medium.

FIG. 3B is a side-view schematic block diagram illustrating how output pulse intensity increases and the HHG beam divergence decreases with (effective) phase matching within the medium. The driving pulse phase velocity is matched to the phase velocity of the generated HHG or the mismatch is greatly minimized. Thus, the coherence length of the (effective) phase matching is extended beyond the optimal medium length $L_{medium}$ in FIG. 3C (ideally $L_{coh} \rightarrow \infty$ for some conditions, or $L_{coh}$ can be finite)—in other words, the entire interaction region is now equivalent to a (+) region of constructive addition of HHG fields.

Figure 3C:
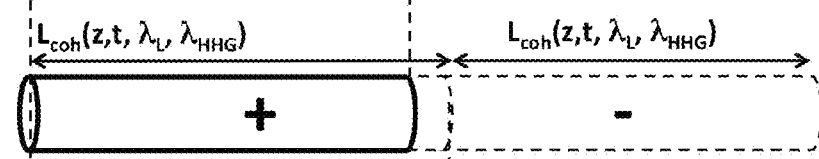
FIG. 3C is a side-view schematic block diagram illustrating coherence length within the medium according to the present invention.

FIG. 3C is a side-view schematic block diagram illustrating coherence length within the medium according to the present invention. In FIG. 3C constructive addition of HHG fields is possible, in contrast to a (−) zone where destructive addition of HHG fields can greatly reduce the HHG signal. No significant destructive interference occurs. If there is finite phase mismatch such a selection of the coherence length with the respect of the medium length can be denoted also as an effective phase matching. In the present art, the coherence length $L_{coh}(z, t, I_L, I_{HHG})$ for any HHG wavelength can be maintained always relatively long by properly selecting the laser parameters and the nonlinear medium parameters.

The coherence length of the upconversion process to first approximation scales as $L_{coh} \sim 1/(q^* I_{Laser})$, assuming very high level of ionization, and the relatively low harmonic orders correspond to high photon energies when we use short wavelength lasers. As a result, this approach allows for significantly long coherence length, that may be comparable to the optimal length of the medium (i.e. close to one or few absorption lengths of the medium), even for high photon energies. Selecting the optimal medium length to be comparable to the relatively long coherence length ensures strong constructive buildup of harmonic signal even at very high ionization levels/strong free electron dispersion.

Figure 3D:
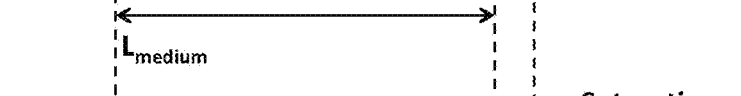
FIG. 3D is a plot showing the intensity of the output pulses with phase matching over the interaction region length comparable to a short absorption length.

FIG. 3D is a plot showing the resulting intensity of the output HHG pulses over the interaction region. It increases strongly with interaction length, until absorption of the generated HHG or evolution of the laser pulse in the gas limits further buildup of HHG signal. Under phase matching conditions or greatly reduced phase mismatch, there is coherent radiation build-up in a very specific direction that reduces the HHG beam divergence, as shown in FIG. 3B.

Figure 3E:
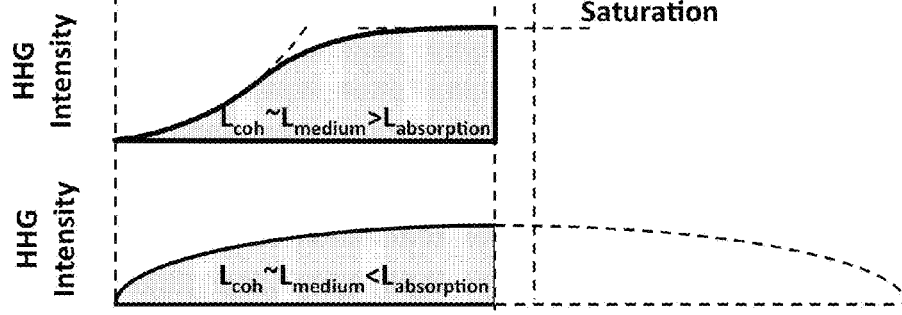
FIG. 3E is a plot showing the intensity of the output pulses with effective phase matching over the interaction region comparable to a long absorption length.

FIG. 3E is a plot showing that effective phase matching may be achieved also for a finite coherence length that can be relatively short (e.g. 1-500 mm), however, the medium length can be selected to be shorter but comparable. Under such conditions a strong coherent buildup can still be achieved and a desired number of photons can be obtained since the emission from a single atom significantly increases for shorter laser wavelengths. In such an optimization, the absorption medium length may not be reached and absorption limited HHG upconversion may not be obtained.

FIGS. 4A-6C illustrate phased matched HHG in three regimes: prior art Regime II, Regime IIIA according to the present invention, and Regime IIIB according to the present invention. Refer back to Table 1 for the characteristics of each Regime. Briefly, in Regime II, phase matching is achieved as a balance between neutral atom dispersion and free electron plasma dispersion that has an opposite sign in a lightly ionized medium. In Regime IIIA, the balance is between the dispersion of neutral atoms in combination with the dispersion of low-charged ions of the same sign, and the plasma dispersion in a highly ionized medium. The resulting group velocity mismatch here is minimal. In Regime IIIB, full balance cannot be achieved, but the phase mismatch is minimized by balancing between dispersion of neutral atoms plus multiply-charged ions and plasma dispersion in a multiply-charged medium. The resulting group velocity mismatch here increases but it can be relatively small compared to that in Regime II.

FIG. 4A is a schematic flow diagram illustrating phase velocity matching of the driving laser light and the generated light in Regime IIIA according to the present invention. In Regime IIIA, phase matching is optimized in a highly ionized medium. To optimize macroscopic phase matching in the process of HHG means that the driving laser pulse and the generated HHG pulses propagate through the nonlinear medium almost at the same phase velocity.

When HHG emission is in the EUV and HHG region of the spectrum the HHG phase velocity is very close the speed of light in vacuum $v_{HHG} \approx c$ and may vary insignificantly when changing the parameters of the medium. Therefore, the phase velocity of the driving laser is the one that has to be primarily optimized through the laser and medium parameters and has to be also $v_{LASER} \approx c$. In principal, while the plasma dispersion speeds up the phase velocity of the laser, the normal neutral atom and ionic dispersions slow it down. Since almost all harmonics propagate at the same phase velocity, obtaining phase matching in HHG upconversion usually results in simultaneous phase matching for the whole HHG bandwidth, which can be the case in Regimes IIIA and B and Regime II. Note that for HHG in the VUV region the deviation from c may be significantly bigger and the optimal parameters may be modified in comparison to HHG in the EUV and X-ray regions.

In Regime IIIA, the indices of refraction (both linear and nonlinear) of both atoms and ions increase as we decrease the laser wavelength towards the VIS-UV-VUV regions. Furthermore, in this regime the indices of refraction of ions are comparable to that of atoms. Thus, under some conditions much larger plasma dispersion can be balanced by neutral atom and ionic dispersions (see FIG. 6A). It has been considered in the past that such a balance is not possible since plasma dispersion dominates the interaction leading to a significant phase mismatch and poor upconversion efficiency. In Regime IIIA the balance may be achieved between neutral atom including low charged ionic dispersion and relatively high plasma dispersion. In some instances the neutral atoms may be ionized and not present later in the laser pulse.

FIG. 4B is a schematic flow diagram showing the reduced phase velocity mismatch in Regime IIIB in the present invention. At very high laser intensities in Regime IIIB, multiply charged ions can be generated. Under such conditions full balance between the phase velocities cannot be achieved, however, the phase mismatch is relatively low allowing for efficient upconversion. Since the plasma dispersion is larger at larger ionization levels (due to higher laser intensity), although the total index of refraction (including linear and nonlinear indices) increases of both neutral atoms and ions, the phase velocity of the laser is slightly greater than but close to c, $v_{LASER}$-c (see FIG. 6B). In Regime III B the neutral atoms may disappear completely quite early during the laser pulse and most of the higher order harmonics may be efficiently generated predominantly only from ions. In some cases, as many as few multiply charged ions can counteract the much higher plasma dispersion to greatly reduce the phase mismatch or achieve effective phase matching over a properly selected medium length.

FIG. 4C (Prior Art) is a schematic flow diagram showing phase velocity matching with Regime II. In prior art Regime II, phase matching is obtained as a balance between neutral atom dispersion and free electron plasma (see FIG. 6C). The balance in Regime II can be achieved only up to relatively low plasma dispersion since the indices of refraction of atoms and ions decrease and are relatively low as we increase the laser wavelength towards the mid-IR. In this regime, the contribution of any ionic dispersion is negligible.

FIG. 5A is a schematic flow diagram illustrating resulting group velocity matching of the driving laser light and the generated light in Regime IIIA according to the present invention.

While the phase velocity of the driving laser pulse is associated with the propagation of the carrier frequency of the electric field, the group velocity is associated with the propagation of the envelope of the field (refer to FIG. 3A). In principal, for a medium with normal dispersion the group velocity is always smaller than the speed of light in vacuum $v^{GROUP}_{LASER} < c$ and full group velocity matching cannot be achieved. Most of the HHG light propagates not only with a phase velocity but also with group velocity very close to c, $v^{GROUP}_{HHG} \approx c$.

In Regime IIIA, the resulting group velocity mismatch under optimal conditions is significantly minimized when the laser wavelength is decreased. This means that a UV driving pulse with either a smaller or a larger number of cycles can maintain phase matching and one can generate either an isolated HHG burst or a train of burst with similar efficiency per laser cycle. In contrast, for a few-cycle mid-IR driving pulse phase matching can be destroyed for a relatively small density-length product and efficient upconvertion can be precluded. This is because the envelope of the laser field lags with respect to the carrier field and the amplitude of the carrier is modified, hence, phase matching is affected. Thus, unless any additional technique is used, a larger number of cycles may be desirable for a mid-IR laser pulse to obtain group velocity mismatch that is effectively reduced in order to preserve phase matching.

FIG. 5B is schematic flow diagram illustrating resulting reduced group velocity mismatch in Regime IIIB according to the present invention. In the present invention in Regime IIIB, at much higher laser intensities and higher gas pressures compared to Regime IIIA, the group velocity mismatch increases. However, since the optimal propagation length can be relatively short the group velocity walk off is effectively smaller.

FIG. 5C (Prior Art) is a schematic flow diagram illustrating resulting group velocity mismatch of the driving laser light and the generated light in prior art Regime II. When the phase velocities are matched in the conventional Regime II, as we increase the laser wavelength there is a resulting group velocity mismatch that is severe. This is due to high optimal pressure-length products required to achieve phase matching and to compensate for low emission from a single atom. Additional optimization (e.g. increasing the number of laser cycles, pulse shaping, etc.) or techniques are needed to mitigate the effect and preserve phase matching.

Figure 6A:
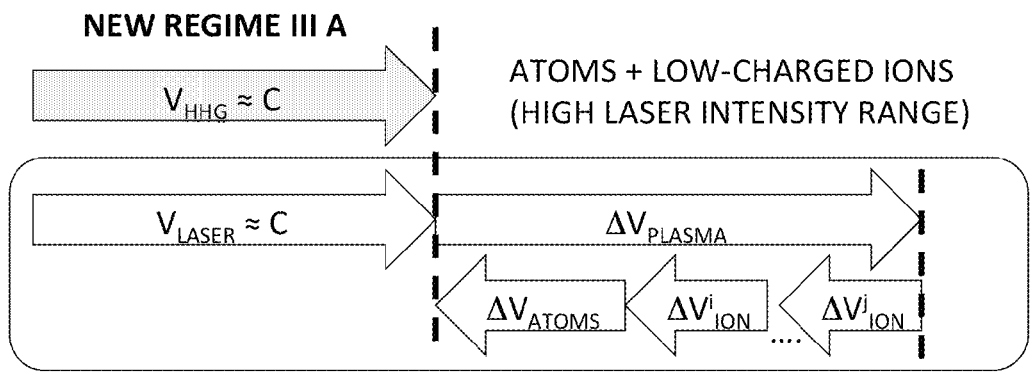
FIG. 6A is a detailed schematic flow diagram illustrating the phase velocity matching of the driving laser light and the generated light where dispersion of atoms and of low charged ions can compensate large plasma dispersion in Regime IIIA according to the present invention.

FIG. 6A is a detailed schematic flow diagram illustrating the phase velocity matching of the driving laser light and the generated light where dispersion of atoms and low charged ions can compensate large plasma dispersion in Regime IIIA according to the present invention. As discussed with respect to FIG. 4A, phase matching is achieved as a dispersion balance between atoms and low-charged ions in a highly ionized medium.

Figure 6B:
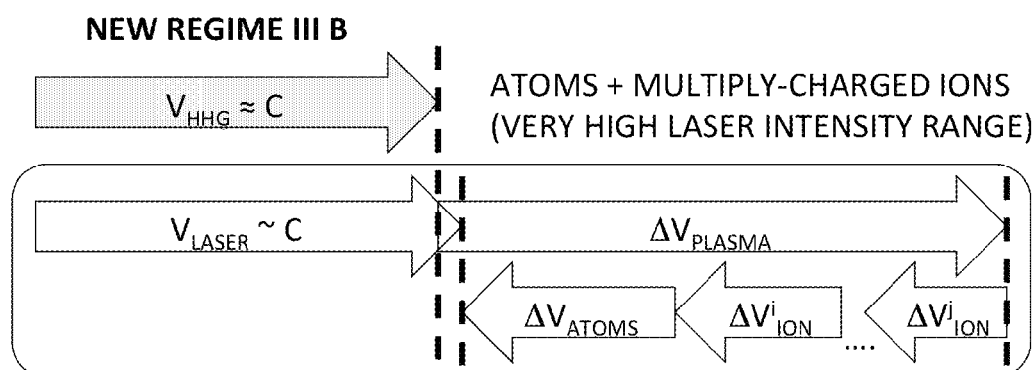
FIG. 6B is a detailed schematic flow diagram illustrating the reduced phase velocity mismatch where dispersion of atoms and predominantly dispersion of multiply charged ions can mitigate larger plasma dispersion in Regime IIIB according to the present invention.

FIG. 6B is a detailed schematic flow diagram illustrating the reduced phase velocity mismatch where dispersion of atoms and multiply charged ions can mitigate larger plasma dispersion in Regime IIIB according to the present invention. As discussed with respect to FIG. 4B, full balance cannot be achieved, but the phase mismatch is minimized by counterbalancing dispersion of atoms and multiply-charged ions and very high plasma dispersion in a multiply-charged medium.

Figure 6C:
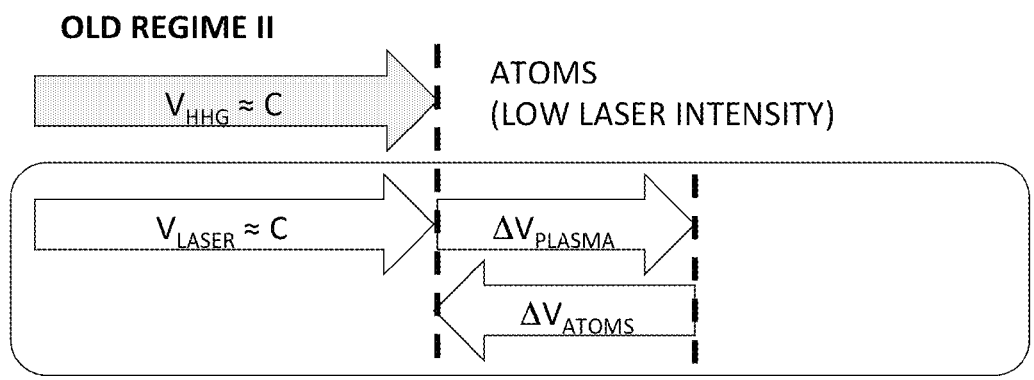
FIG. 6C (Prior Art) is a detailed schematic flow diagram illustrating the phase velocity matching of the driving laser light and the generated light in prior art Regime II, where atomic dispersion compensates plasma dispersion and ionic dispersion is negligible.

FIG. 6C (Prior Art) is a detailed schematic flow diagram illustrating the phase velocity matching of the driving laser light and the generated light in prior art Regime II, where ionic dispersion is negligible. As discussed with respect to FIG. 4C (Prior Art), phase matching is achieved as a balance between neutral atom dispersion and free electron plasma dispersion in a lightly ionized medium.

Figure 7A:
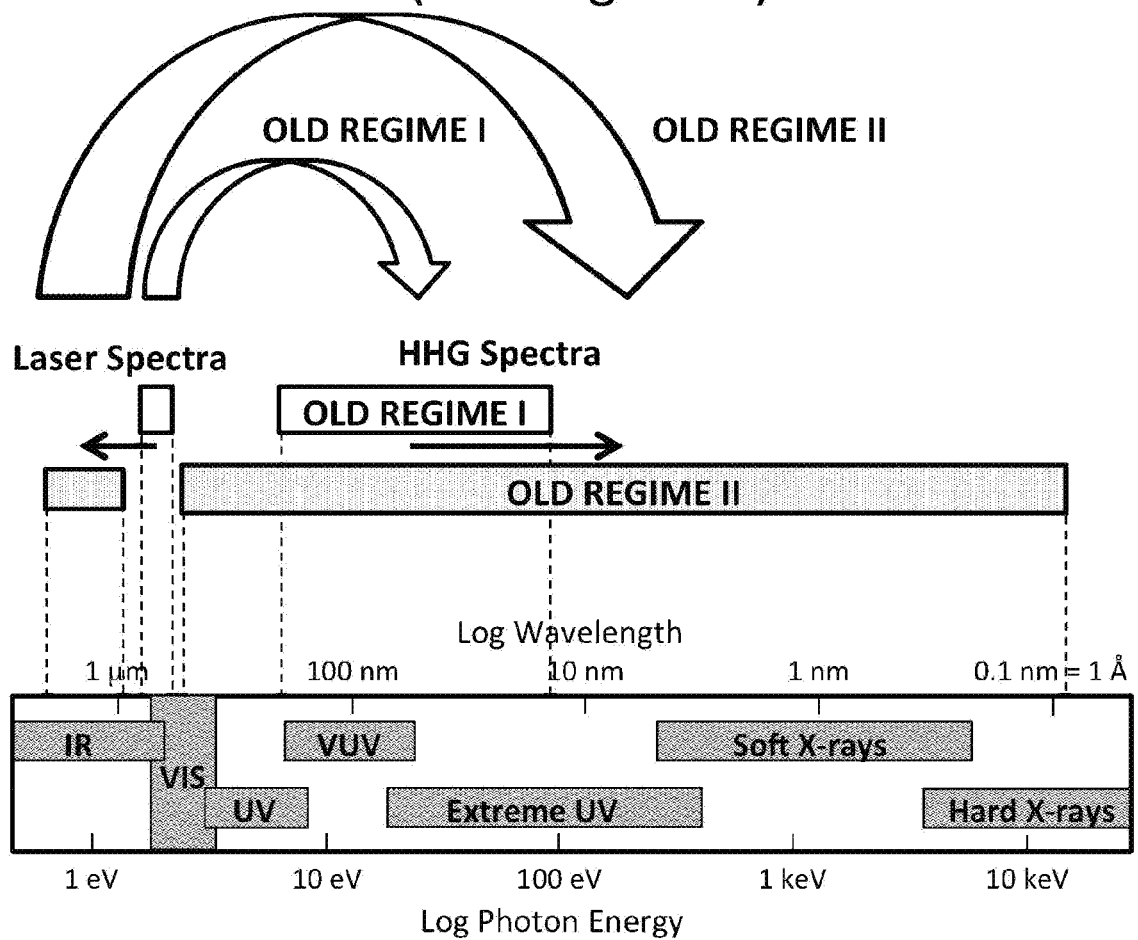
FIG. 7A (Prior Art) is a schematic spectral domain diagram illustrating the regions of the laser spectra and the upconverted HHG spectra with phase matching according to prior art Regimes I and II.

FIG. 7A (Prior Art) is a schematic spectral domain diagram illustrating the regions of the laser spectra and the upconverted HHG spectra with phase matching according to prior art Regimes I and II. In this regime, the central laser wavelength of driving laser is tuned from the near-IR towards the mid-IR region of the spectrum. The laser bandwidths in the mid-IR can be relatively broad to support readily both multi-cycle and few-cycle driving pulses. Using longer laser wavelengths broader phase-matched HHG bandwidths are generated that are also centered at much shorter HHG wavelength. The HHG bandwidths can extend from the EUV well into the soft and hard X-ray regions of the spectrum.

Figure 7B:
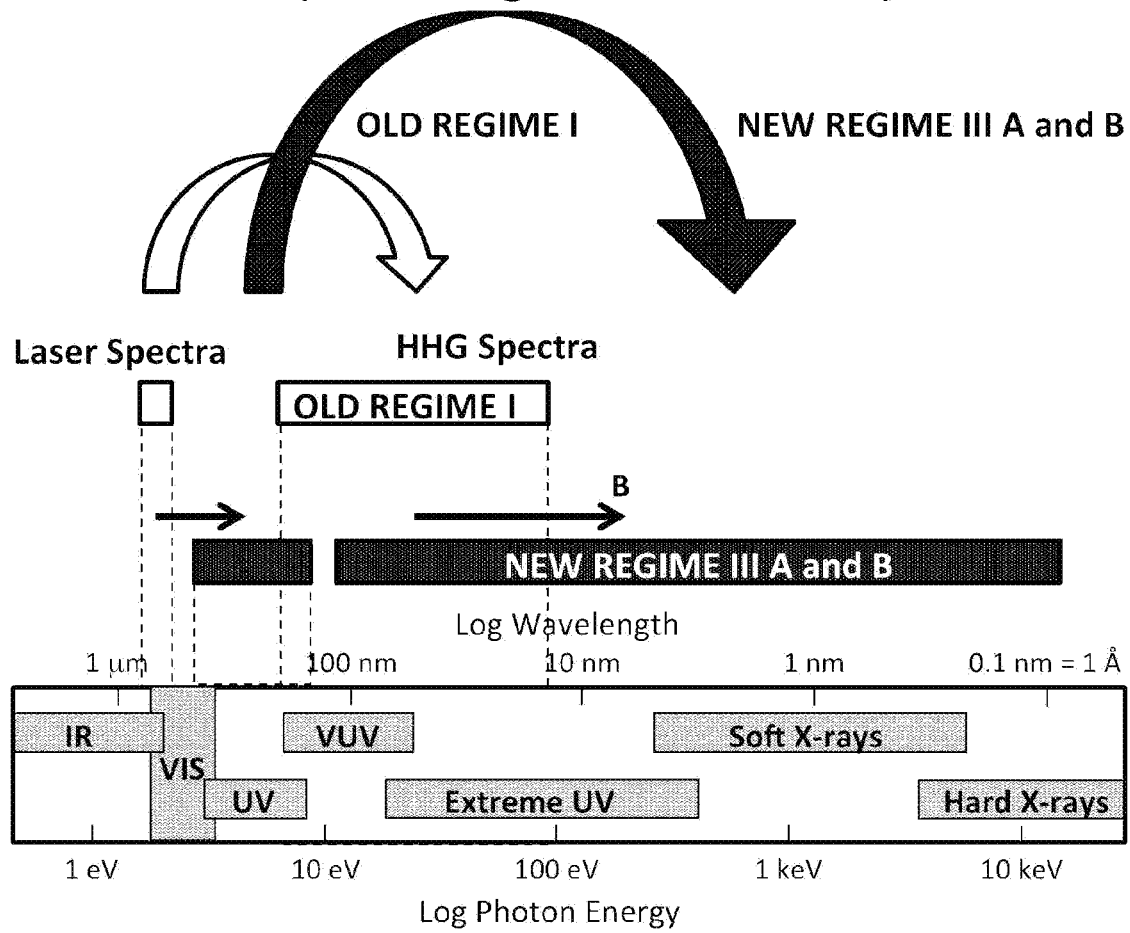
FIG. 7B is a schematic spectral domain diagram illustrating the regions of the laser spectra and the efficient upconverted HHG spectra according to present invention Regimes IIIA and IIIB.

FIG. 7B is a schematic spectral domain diagram illustrating the regions of the laser spectra and the bright upconverted HHG spectra according to present invention Regimes IIIA and IIIB. In these regimes, the central laser wavelength of driving laser is tuned from the near-IR towards the VIV-UV-VUV regions of the spectrum. That is, using shorter laser wavelengths and high laser intensity, bright, narrower HHG bandwidths from atoms and low charged ions can be generated at longer HHG wavelength in the VUV-EUV regions. Also, using shorter laser wavelengths and very high laser intensities can result in unexpectedly bright broader HHG bandwidths from atoms and multiply charged ions at much shorter HHG wavelength. These HHG bandwidths can extend from the EUV well into the soft and hard X-ray regions of the spectrum.

Figure 8:
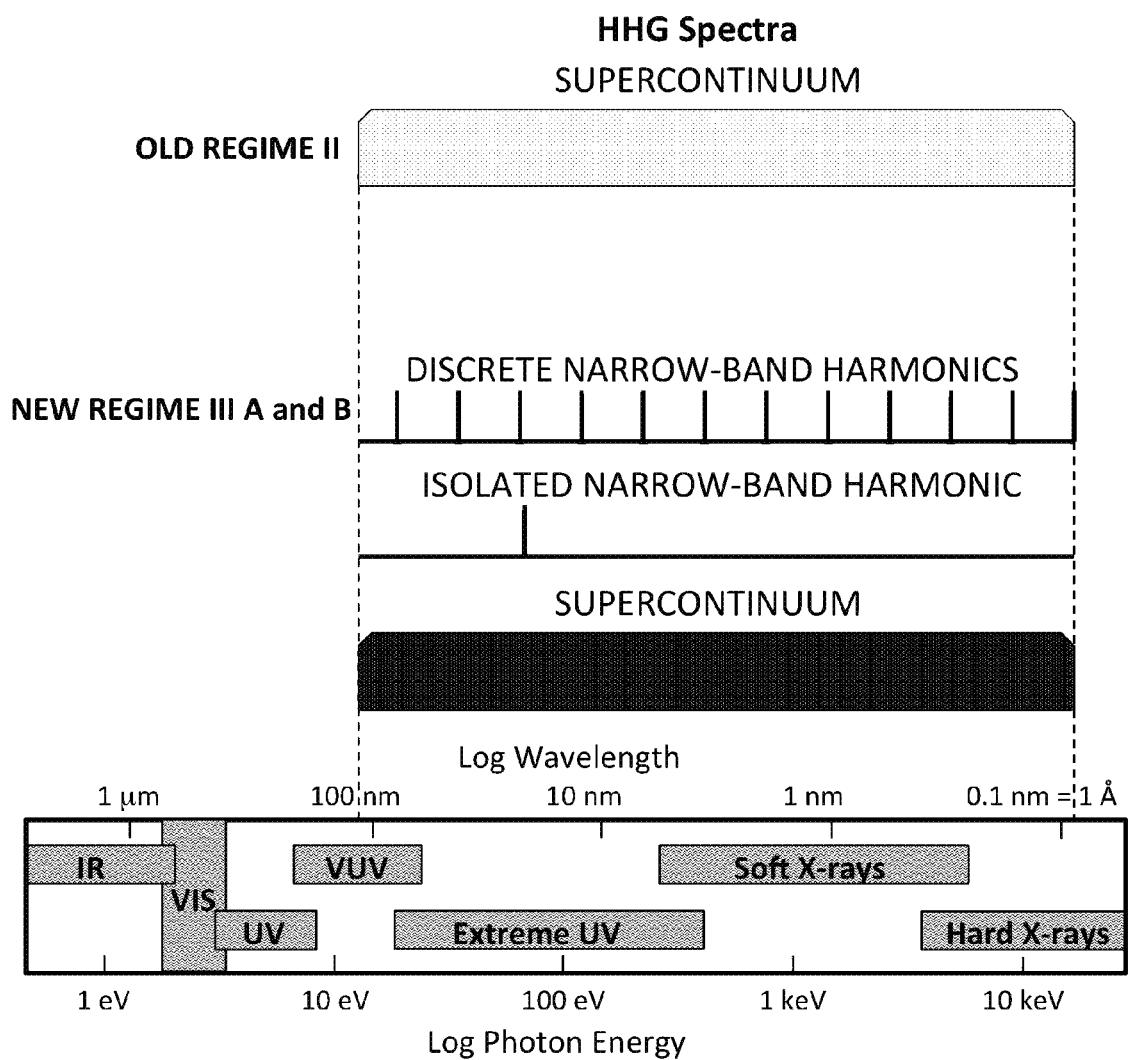
FIG. 8 is a schematic spectral domain diagram illustrating output pulse spectral shape of upconverted HHG light according to prior art Regime II and the present invention, Regimes IIIA and IIIB.

FIG. 8 is a schematic spectral domain diagram illustrating output pulse spectral shapes of upconverted HHG light according to prior art Regime II and the present invention, Regimes IIIA and IIIB. Using longer mid-IR laser wavelengths, the phase matched HHG spectra exhibit supercontinuum structure (prior art Regime II). This is due to the fact that the phase matching window within the driving pulse greatly reduces as we increase the laser wavelength and the generation of an isolated HHG burst can be a norm. In the present invention the phase matching window increases for shorter laser wavelength. Furthermore, the resulting group velocity mismatch can be minimized. Thus either a broad comb of discrete bright harmonics can be generated in the spectral domain when a multi-cycle, shorter-wavelength UV laser pulse is used, or a supercontinuum spectrum can be generated for a few-cycle driving pulse. The harmonic comb produced can have a very pure structure—the high order harmonics in Regime III can be well separated with fewer of them in the whole spectrum compared to Regime II. In addition, since the harmonic peaks generated by a shorter-wavelength UV laser are separated by a larger photon energy spacing, isolation of a single harmonic or several harmonics becomes more practical. For example, using a combination of low-pass and high-pass thin film filters that simultaneously may reject the fundamental light, and selecting a specific laser intensity can isolate a single harmonic or several harmonics. Also, a proper selection of nonlinear medium, thin film filters, and maximum phase matching energy can result in a similar harmonic selection.

Figure 9A:
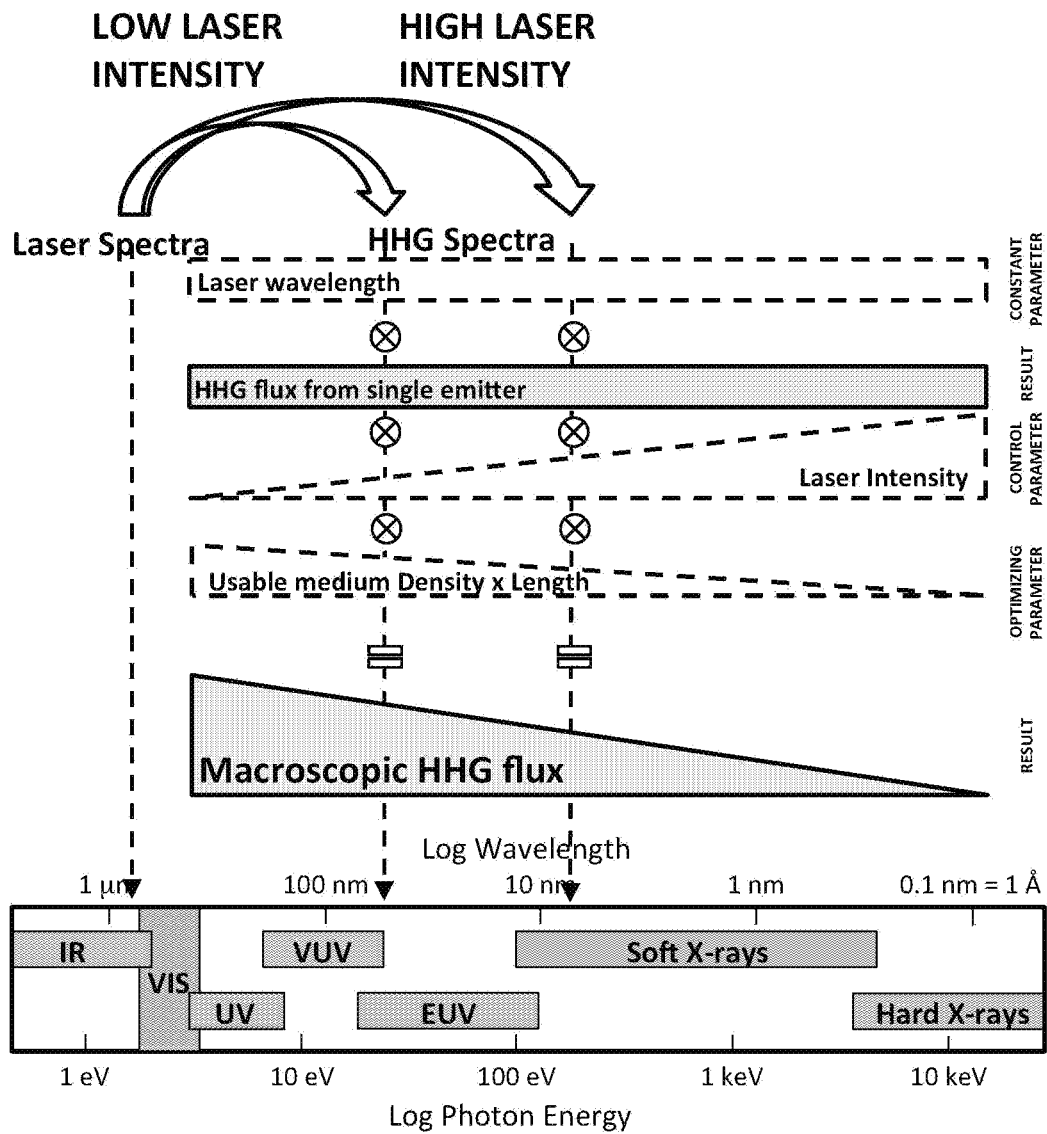
FIG. 9A (Prior Art) is a schematic diagram illustrating the control parameters, optimizing parameters, and resulting macroscopic HHG flux in conventional for prior art Regime I, and shows parameters and results at various wavelengths.

FIG. 9A (Prior Art) is a schematic diagram illustrating the control parameters, optimizing parameters, and resulting macroscopic HHG flux in conventional for prior art Regime I, and shows parameters and results at various wavelengths. Regime I generates photons in the EUV and in the soft X-ray regions by using the same laser wavelength in the near-IR region for which the resulting HHG flux from a single emitter does not vary significantly. Optimization here requires increasing the laser intensity as a control parameter, which reduces the usable density-length product (lower number of potential emitters) due to ionization induced effects. Quantitatively, under some conditions the coherence length can decrease rapidly to about 1-100 mm at very high laser intensities and the optimal pressure can decrease to 1-5 torr. The resulting non-phase-matched HHG flux drops rapidly at short wavelengths.

Figure 9B:
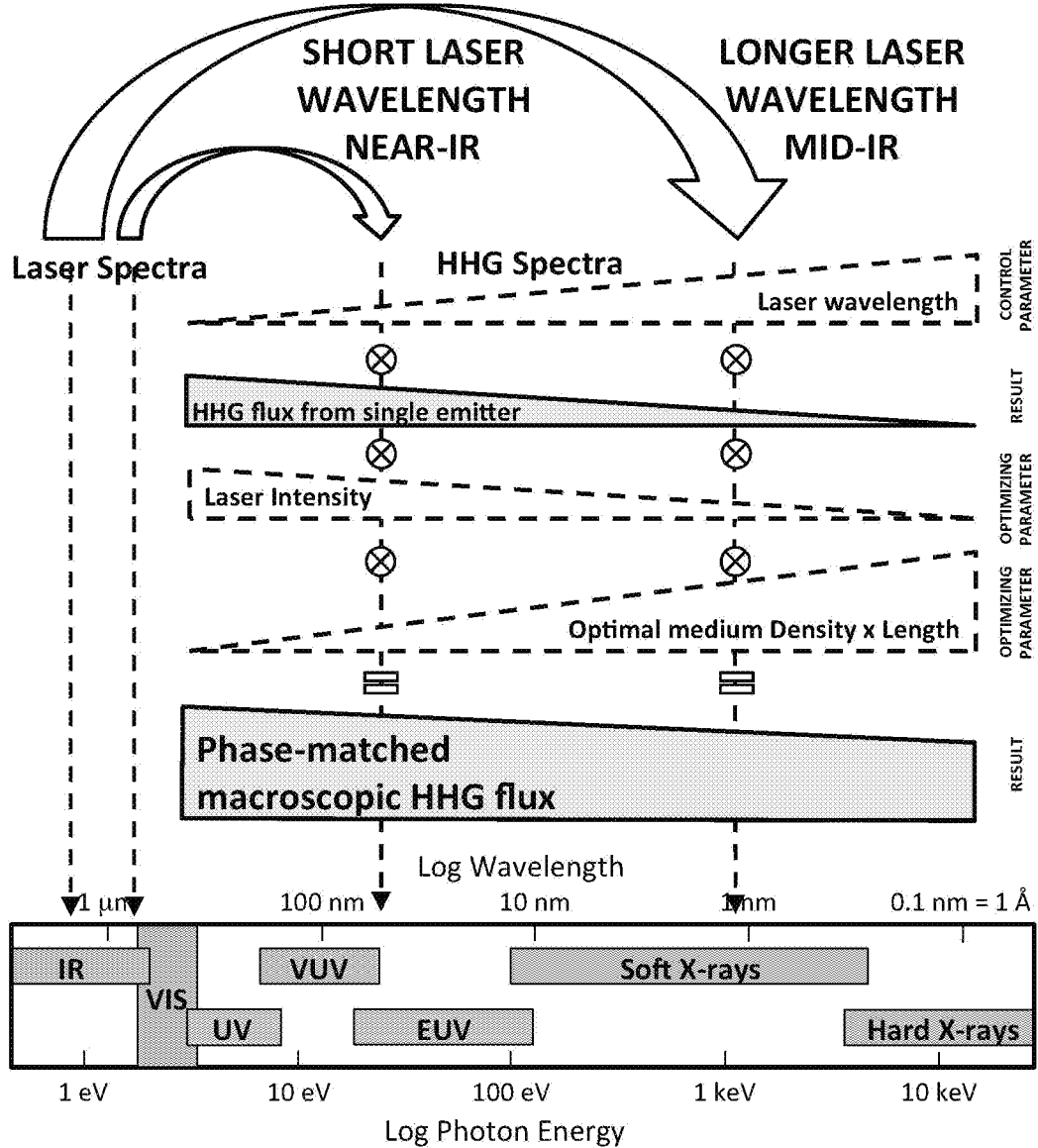
FIG. 9B (Prior Art) is a schematic diagram illustrating the control parameters, optimizing parameters, and resulting macroscopic HHG flux in conventional for prior art Regime II, and shows parameters and results at various wavelengths.

FIG. 9B (Prior Art) is a schematic diagram illustrating the control parameters, optimizing parameters, and resulting macroscopic HHG flux in conventional for prior art Regime II, and shows parameters and results at various wavelengths. Regime II relies on increasing the laser wavelength towards the mid-IR spectral region as a control parameter. The resulting emission from a single-atom drops rapidly and may scale as $I_{Laser}^{-(7.5-9.5)}$ under optimal conditions depending on the selected bandwidth. Optimizing phase matching in this regime involves simultaneous decrease in laser intensity. Furthermore, phase matching conditions at shorter HHG wavelengths using longer driving wavelengths favors large optimal or phase matching density-length products (large number of potential emitters). For a comparison, under some conditions the optimal length can increase to about 0.5-1 cm and greater and the optimal pressure can increase to about 1-40 atmospheres compensating for the poor single-atom yield. As a result, the macroscopic phase-matched HHG flux may vary slightly with wavelength.

Figure 9C:
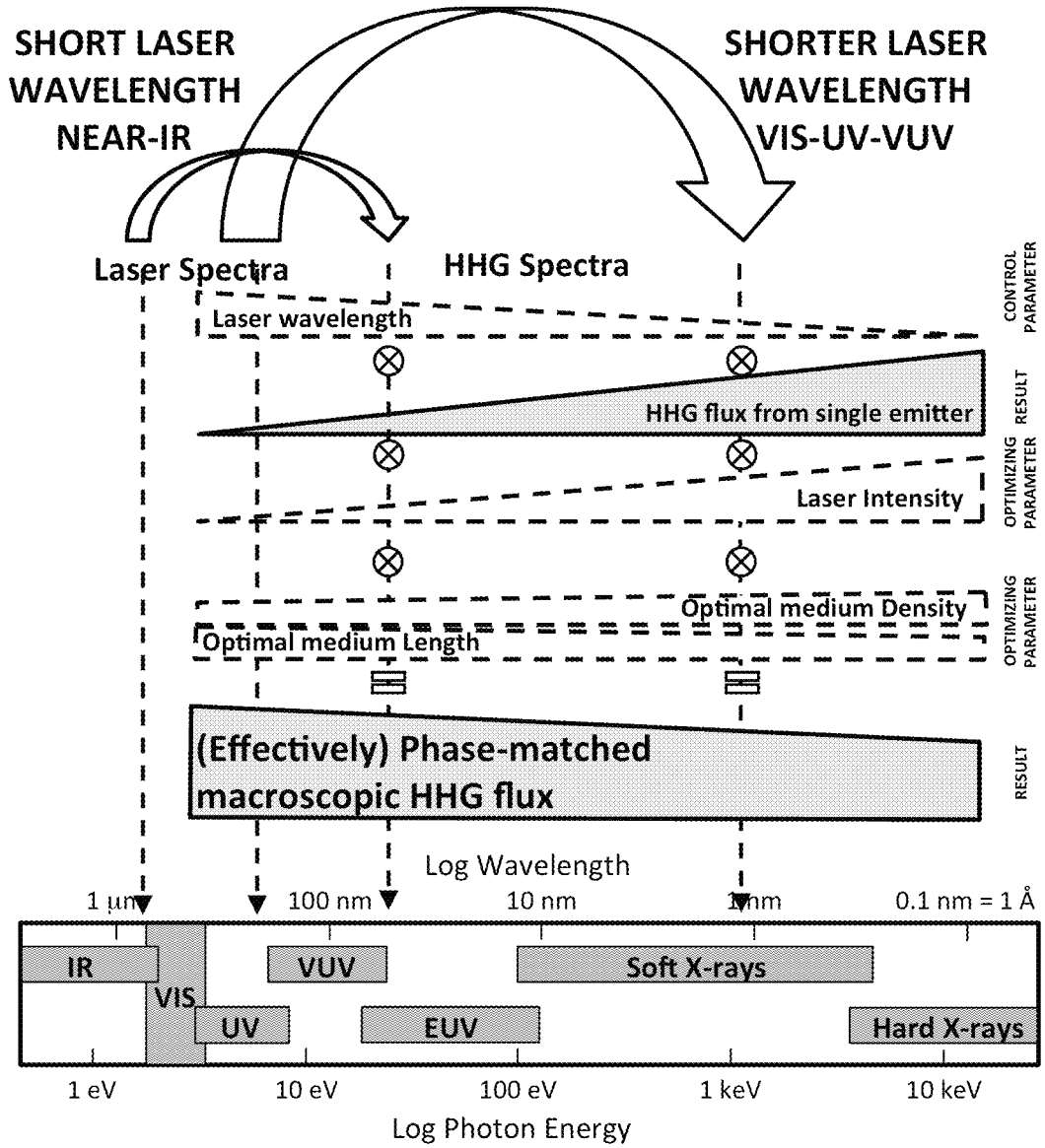
FIG. 9C is a schematic diagram illustrating the control parameters, optimizing parameters, and resulting macroscopic HHG flux Regime III according to the present invention.

FIG. 9C is a schematic diagram illustrating the control parameters, optimizing parameters, and resulting macroscopic HHG flux Regime III according to the present invention. The laser wavelength is decreased towards the VIS-UV-VUV region to generate bright harmonics in the VUV-EUV-X-ray regions of the spectrum. In contrast to Regime II, this new regime does not compromise in terms of a single-atom/single-ion emission. Here, the microscopic radiation increases rapidly as the laser wavelength decreases and may scale as fast as $I_{Laser}^{-7.5}$ for a bandwidth of a single harmonic. To obtain bright phase matched or effectively phase matched emission at higher photon energy the laser intensity has to be increased simultaneously with the decreasing the laser wavelength. The pressure-length product here can be split into optimal length and optimal pressure considering optimization. In principle, the coherence length scales as $L_{coh} \mu 1/(qI_L P)$ under some considerations, and can be allowed to decrease when decreasing $I_{Laser}$ since the single-atom/single-ion yield is strong and shorter interaction length may result in usable flux for applications. Furthermore, since higher photon energies are generated while higher ionization states are produced the optimal pressure may increase. On one hand, the absorption drops at higher HHG photon energies. On the other hand, the absorption of the ionized medium may also decrease during the time interval within the laser pulse when atomic and ionic species relevant to a specific absorption disappear.

Figure 10A:
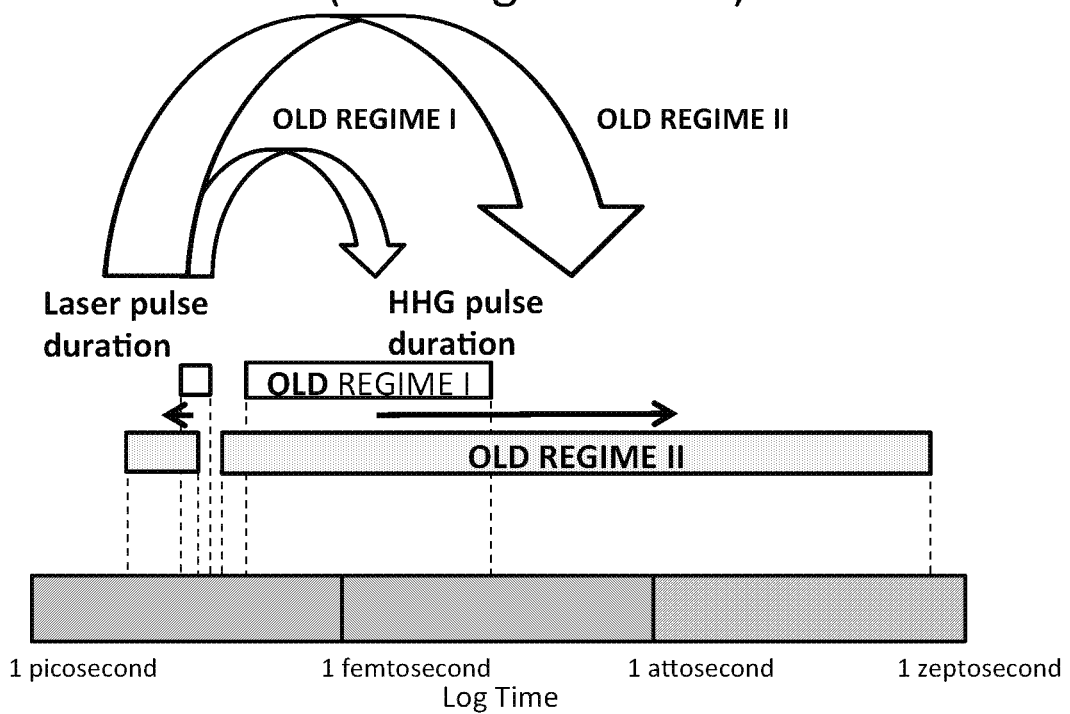
FIG. 10A (Prior Art) is a schematic time domain diagram illustrating the regions of the driving laser pulse durations and the HHG pulse durations with phase matching in prior art Regimes I and II at various wavelengths.

FIG. 10A (Prior Art) is a schematic time domain diagram illustrating the regions of the driving laser pulse durations and the HHG pulse durations with phase matching in prior art Regimes I and II at various wavelengths. The achievable pulse durations in prior art Regime I are on the femtosecond-to-attosecond time scales. A smaller range of HHG output pulse durations is achievable due to the narrower phase-matched HHG bandwidth available. The results achievable with prior art Regime II are in the femtosecond-to-attosecond-to-zeptosecond time scales. The available HHG pulse duration range is larger due to the larger phase-matched HHG bandwidths. The driving laser pulses in Regime II are longer than those in Regime I since the period of the laser pulse is longer for longer-wavelength mid-IR lasers—longer femtosecond time scales compared to shorter femtosecond time scales, respectively. The time scales of the laser pulses and the HHG pulses are shown on log scale.

Figure 10B:
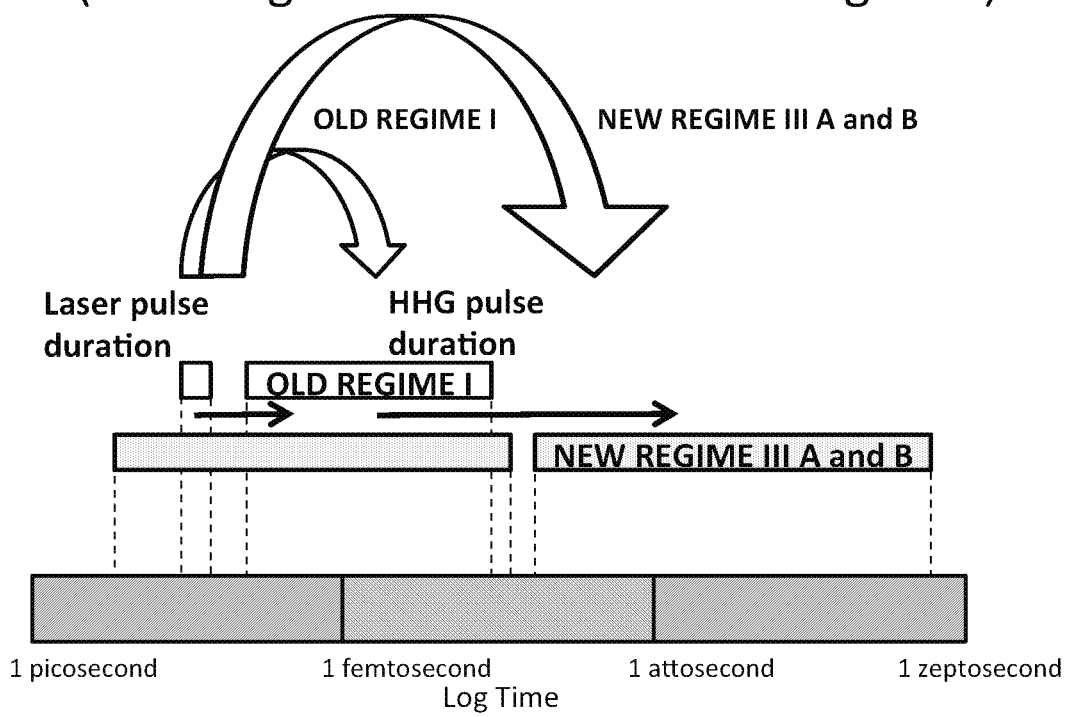
FIG. 10B is a schematic time domain diagram illustrating the regions of the driving laser pulse durations and the HHG pulse durations with phase matching in prior art Regime I and in phase matching and effective phase matching in Regime III according to the present invention at various wavelengths.

FIG. 10B is a schematic time domain diagram illustrating the regions of the driving laser pulse durations and the HHG pulse durations with phase matching in prior art Regime I and Regime III according to the present invention at various wavelengths. FIG. 10B illustrates achievable HHG pulse durations with devices according to the present invention. A broad range of pulse durations similar to that in Regime II can be obtained—femtosecond-to-attosecond-to-zeptosecond time scales. This is because the bright emission from ions can extend the available bright coherent HHG bandwidth. In contrast, the driving pulse durations cover a broader range compared to Regimes I and II. First, using shorter UV-VUV laser wavelengths means that the driving pulse may have a pulse duration in the attosecond time scale. Second, phase matching and greatly reduced phase mismatch can allow longer pulse durations to be used—much greater than 10-100 fs (significantly longer durations compared to the duration of the cycle at these wavelengths). The reason for this is that the efficient VUV-UV-VIS driven HHG can tolerate much larger ionization levels that increase with every additional laser cycle.

FIGS. 11A-D are time domain diagrams illustrating input laser pulse shapes and output HHG pulse shapes according to prior art Regime II. FIG. 11A depicts a single driving ultrashort pulse input. FIG. 11B indicates that a more complex series of pulses, for example, FEL pulses or shaped pulses, consisting of several ultrashort micro-pulses within a long, macro-pulse, can be used. FIG. 11C shows that a series of pulses may be generated by the driving pulse of either 11A or 11B. Note that each HHG pulse is chirped to a relatively long pulse duration compared to its transform limit that can be reached after compression. Since the phase matching window narrows as we increase the laser wavelength, FIG. 11D shows that a single output pulse may be easily achieved.

Figure 12A:
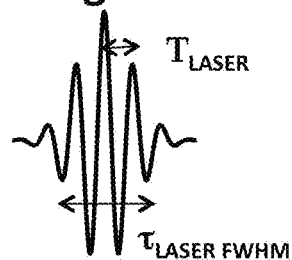
FIGS. 12A-D are time domain diagrams illustrating input laser pulse shapes and output HHG pulse shapes according Regime III of the current invention.
Figure 12B:
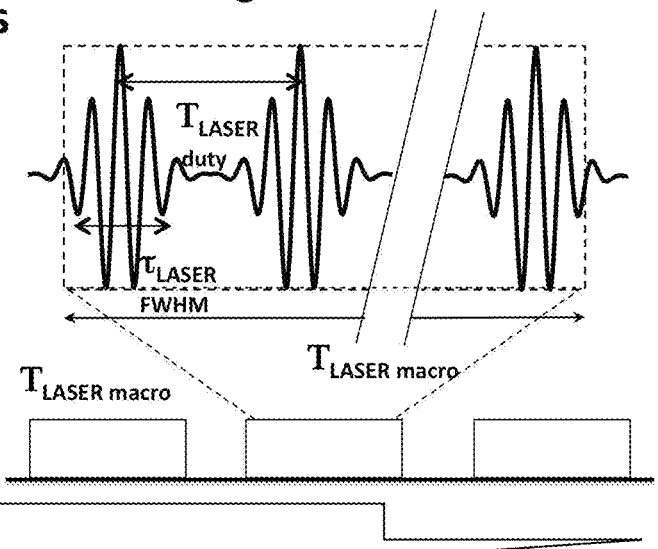
Figure 12C:
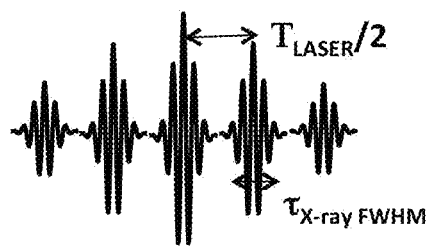
Figure 12D:

FIGS. 12A-D are time domain diagrams illustrating input laser pulse shapes and output HHG pulse shapes according Regime III of the current invention. Similar input laser pulse shapes can be used. In FIG. 12A, the input pulse may have either small or relatively large numbers of cycles since the phase matching window can be longer and the resulting group velocity can be mitigated. The complex series of pulses in FIG. 12B may be closer in micro or macro separation since higher ionization level can be tolerated. A proper design of the micro and macro pulses may lead to an effective increase of the repetition rate of the laser with the purpose to increase the number of HHG photons per sec. Depending on the number of driving laser cycles, the output HHG pulses may be a train of HHG pulses as in FIG. 12C, or an isolated HHG pulse as in FIG. 12D. Each HHG pulse is chirped to a shorter pulse duration compared to Regime II (shown in FIGS. 11A-D). Again, since the phase matching window is longer and the driving pulses are less susceptible to group velocity walk off effects, the output HHG flux can be increased additionally by increasing the number of laser cycles/HHG burst.

Figure 13:
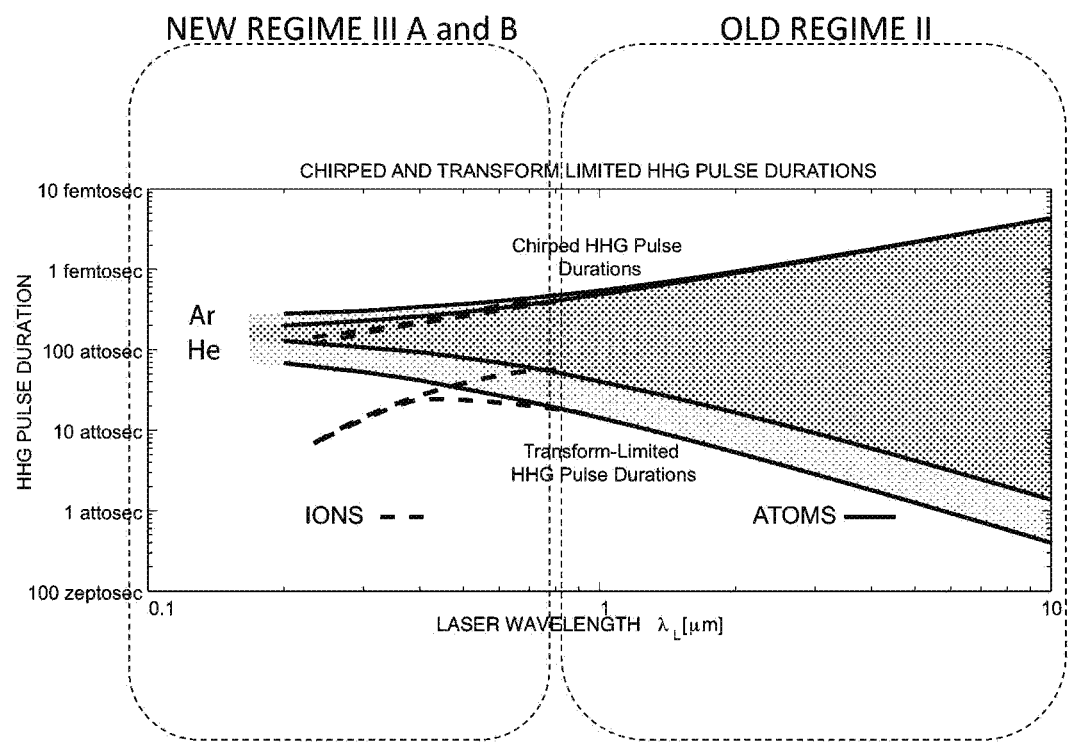
FIG. 13 is a time domain diagram presenting the generated, chirped, HHG pulse durations and the minimum HHG pulse durations if the pulses are compressed for prior art Regime II and Regimes IIIA and IIIB according to the present invention at various wavelengths.

FIG. 13 is a time domain diagram presenting the generated, chirped, HHG pulse durations and the minimum HHG pulse durations if the pulses are compressed for prior art Regime II and Regimes IIIA and IIIB according to the present invention at various wavelengths.

The time domain diagram in FIG. 13 shows a generalized picture of the pulse durations of the generated HHG pulses as a function of the driving laser wavelength for Regime II (right-hand side of figure) compared to Regime III, the present invention (left-hand side of figure). The HHG chirp (the group delay dispersion, GDD) scales as:

$$IGDDI \mu T_{LASER}/U_p$$

where $T_{LASER}$ is the laser cycle duration and the $U_p \mu I_L I_L^2$. Using longer wavelength the chirp decreases approximately as $IGDDI \sim 1/I_L^{0.7}$ since the phase matching cutoffs scale approximately as $h n \mu I_L^{1.7}$. As the available phase matched bandwidths increase almost quadratically the HHG pulses generated directly from the medium have very long pulse durations in the ~1-10 fs range for mid-IR drivers while their transform limited duration after compression can be as short as ~10 attosecond-500 zeptosecond, respectively. In contrast in Regime III, the chirp can be smaller when compared for the same bandwidth at the same photon energy. Thus the generated HHG pulses can be closer to their transform limit. In some cases this may eliminate the need for an HHG compressor that in general is lossy or may reduce the attenuation of the HHG intensity when a small compression is needed. As an example, a 1.3 mm laser can generated phase matched HHG up to ~300 eV in He with HHG pulse durations of >600 attoseconds. A 0.27 mm laser can generate the same bright HHG cutoff. While the transform limited pulse duration in both cases is almost the same for the same bandwidth, the generated HHG pulses in Regime III have 4-5 smaller chirp compared to those in Regime II and can be as short as >125 attosecond before compression. If the laser intensity in Regime III is increased further, the chirp can be decreased to even smaller values, inversely proportionally to the laser intensity.

Figure 14:
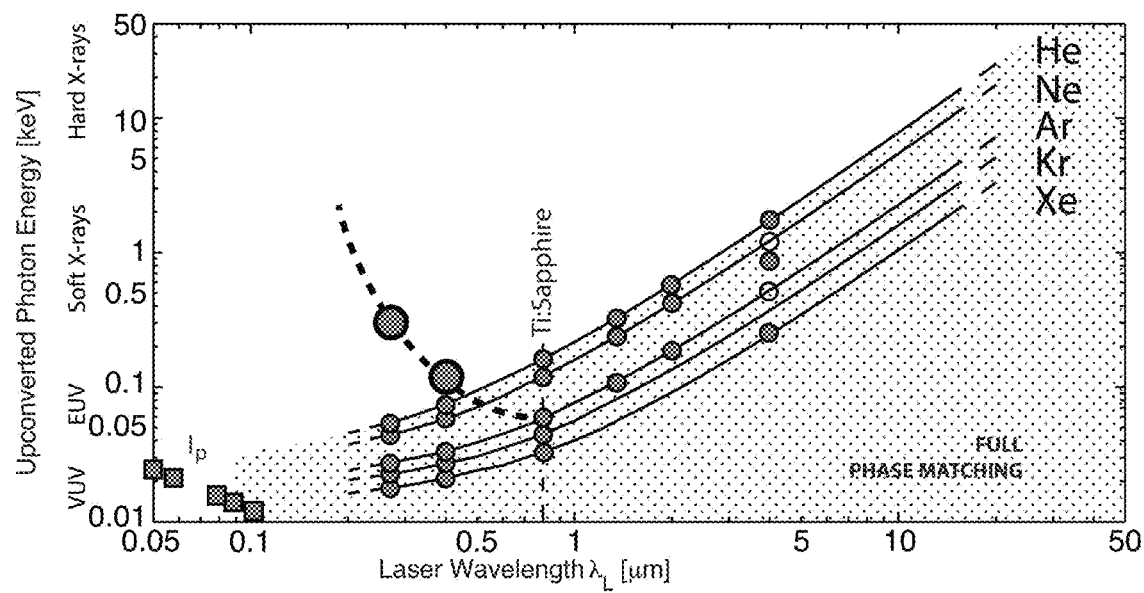
FIG. 14 is plot of HHG phase matching limits for prior art Regime II and efficient HHG upconversion photon energies in Regimes IIIA and IIIB according to the present invention.

FIG. 14 is a plot of HHG phase matching limits for prior art Regime II (right-hand side of figure) and efficient HHG upconversion photon energies in Regimes IIIA and IIIB according to the present invention (left-hand side of figure). FIG. 14 illustrates that by using longer laser wavelength and lightly ionized atoms, bright coherent soft and hard X-rays can be generated (prior art, Regime II). According to the present invention (Regime III), by using shorter laser wavelengths and fully- or multiply-charged ions, bright soft and hard X-rays can be generated. While Regime IIIA may extend the efficient upconversion mostly in the VUV-EUV region, Regime IIIB can extend the emission well into the X-ray region. The two approaches in Regime II and Regime III are complimentary to each other. The first one generates preferably coherent, supercontinuum, X-ray harmonics ideal for spectroscopic type of applications, while the second generates preferably coherent, discrete, X-ray harmonics ideal for imaging type of applications.

Figure 15A:
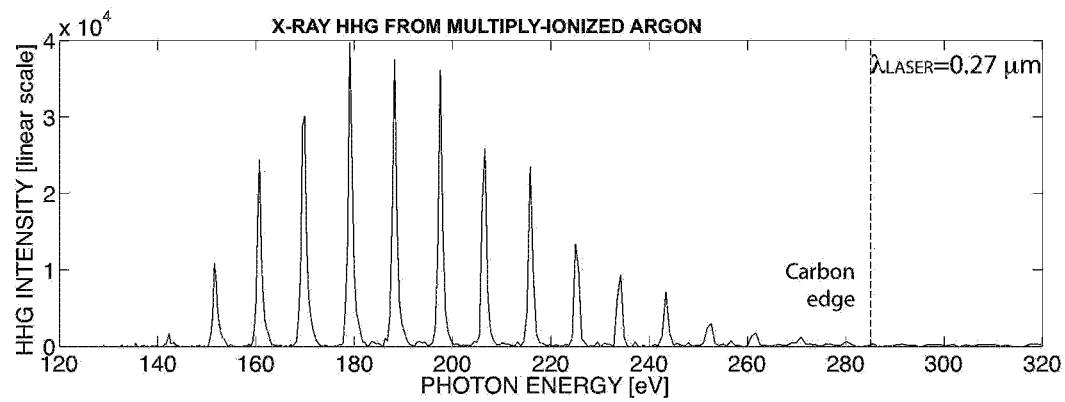
FIG. 15A is a plot showing example experimental data demonstrating spectrally selected bright discrete harmonics in the X-ray region of the spectrum up to the water window in Regime IIIB according to the present invention.

FIG. 15A is a plot showing example experimental data demonstrating spectrally selected bright discrete harmonics in the X-ray region of the spectrum up to the water window in Regime IIIB according to the present invention (linear intensity scale). Experimentally observed UV-driven HHG extends up to the water window at 280 eV, for laser intensities of $>6 \times 10^{15}$ W/cm$^2$. FIG. 15A—linear intensity scale.

Figure 15B:
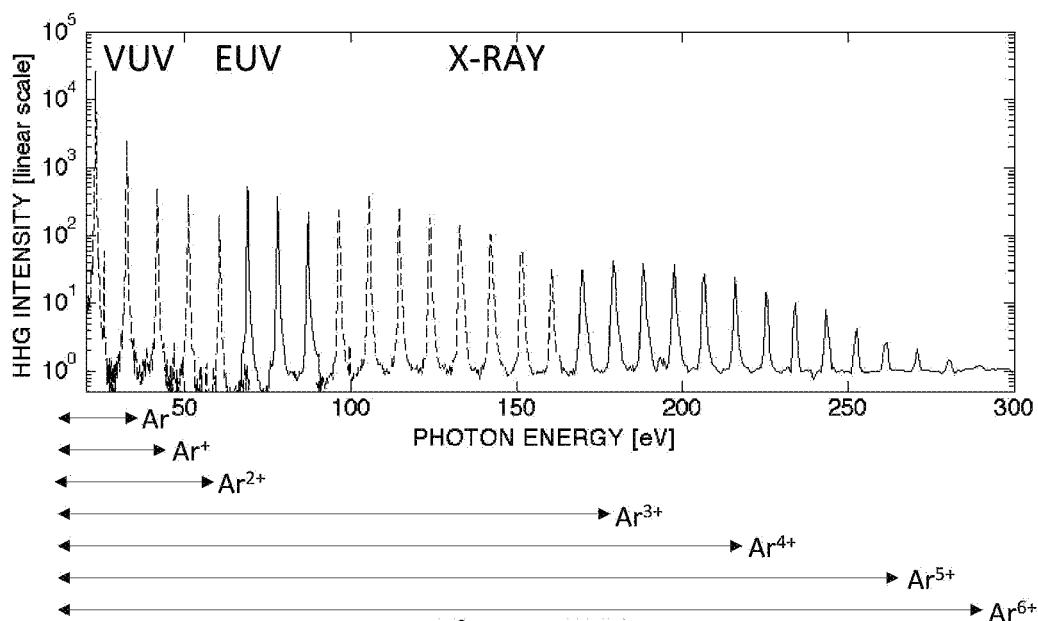
FIG. 15B is a plot showing example experimental data presenting bright discrete harmonics spanning the VUV-EUV-X-ray spectral regions and corresponding multiply charged emitters.

FIG. 15B is a plot showing example experimental data presenting bright discrete harmonics spanning the VUV-EUV-X-ray spectral regions (log intensity scale). The plot shows all the generated VUV-EUV-X-ray discrete narrow-band harmonics except for the 3rd harmonic. Calculation show that the emission above 30 eV must originate from multiply charged ions ($Ar^+$—$Ar^{6+}$).

Figure 16:
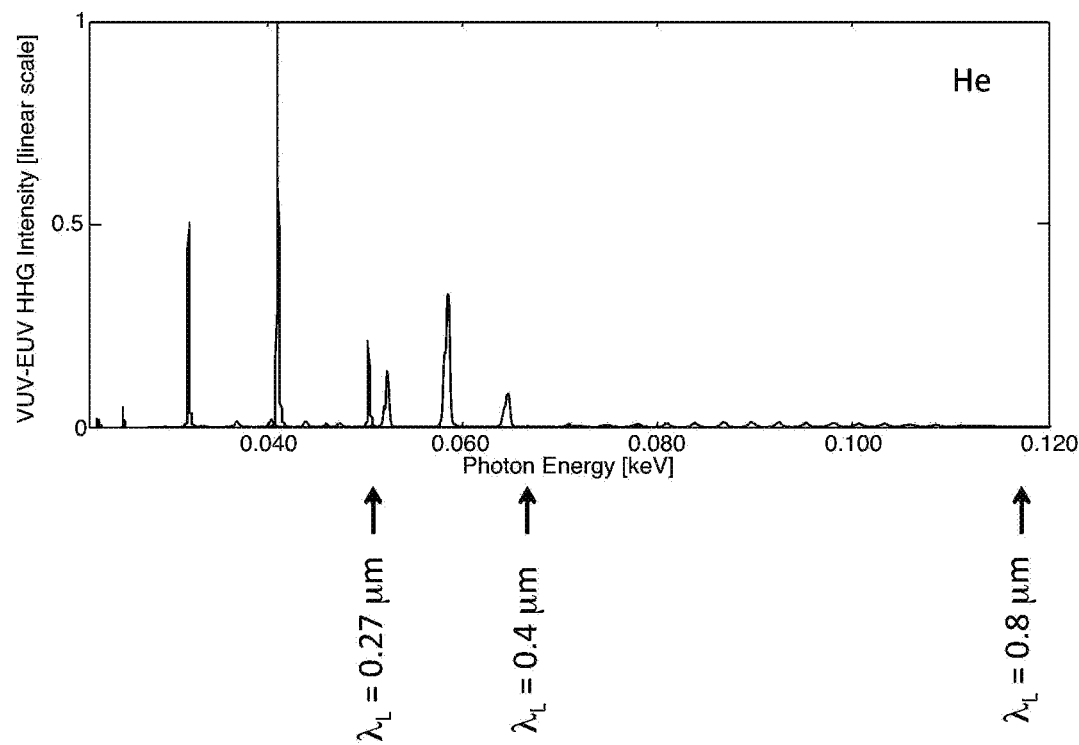
FIG. 16 is a plot showing example experimental data demonstrating ultra-bright discrete harmonics in the EUV spectral region in Regime IIIA according to the present invention.
Figure 17:
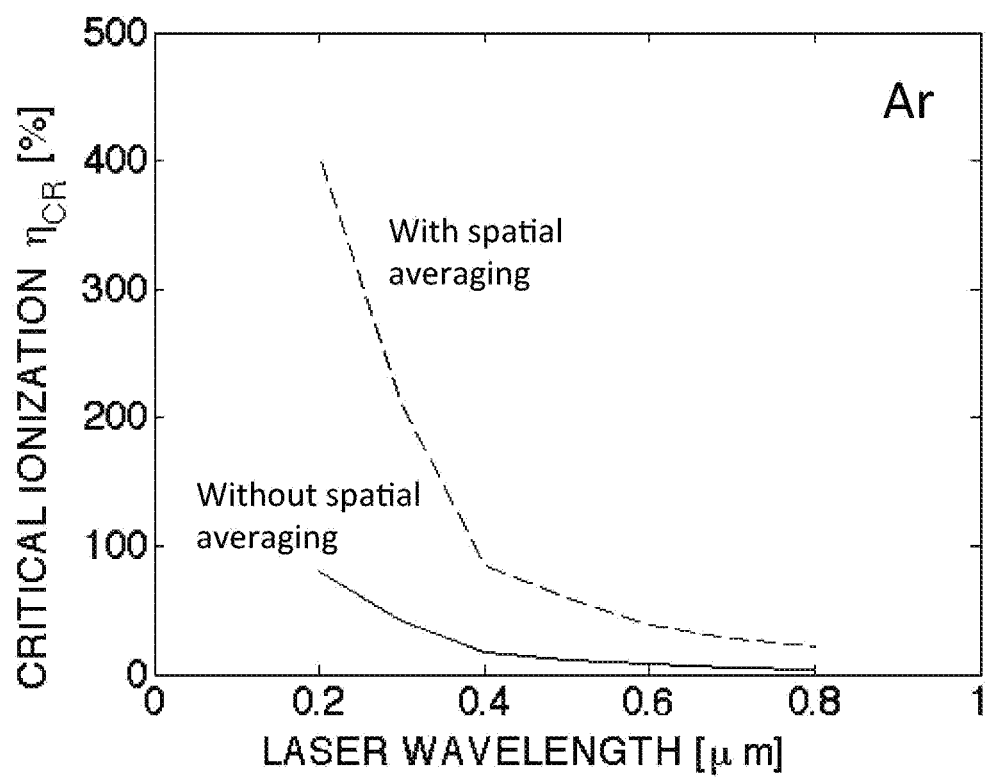
FIG. 17 is a plot showing an example calculation of the critical ionization level of a gas versus laser wavelength for Regime IIIA according to the present invention, with and without spatial averaging.

FIG. 16 is a plot showing example experimental data demonstrating ultra-bright discrete harmonics in the EUV spectral region in Regime IIIA according to the present invention. FIG. 17 is a plot showing an example calculation of the critical ionization level of a gas versus laser wavelength for Regime IIIA according to the present invention, with and without spatial averaging.

In Regime IIIA, when the laser wavelength is decreased and the emission is predominantly from neutral atoms, full phase matching limits decrease from the EUV towards the VUV region. Here, low charged ions compensate additionally for a larger plasma dispersion boosting the macroscopic HHG flux. The conversion efficiency may approach $10^{-4}$ for a 0.4 mm driver, and $10^{-3}$ for a 0.27 mm driver. In some cases, for shorter laser wavelengths and noble gas atoms with larger number of electrons, such as Ar, the critical ionization above which phase matching is not possible may approach 100% for a 0.2 mm driver as shown in FIG. 17. Using averaging of the index of refraction across the laser beam profile shows that the critical ionization that can be tolerated may be increase to about 400% in this case. This means that efficient upconversion may be possible from multiply charged ions ($Ar^+$-$Ar^{4+}$) and increasing the laser intensity further will increase the phase mismatch slowly. For atoms with even larger number of electrons like Kr and Xe, which have higher neutral atom and ion indices of refraction (linear and nonlinear indices), the critical ionization without spatial averaging can be above 100% meaning that full phase matching is possible in ions. Using spatial averaging, the estimated critical ionization can reach fractional levels of ionization corresponding to much higher charged states.

Figure 18A:
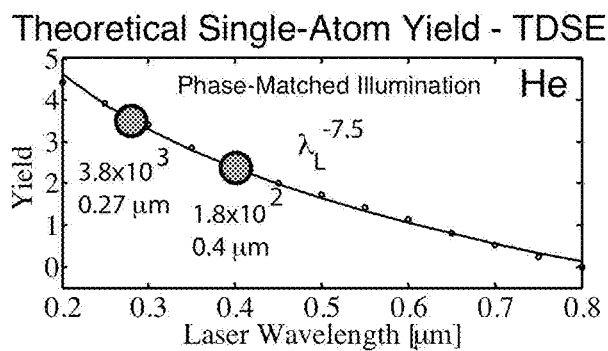
FIG. 18A is a plot showing an example calculation of the expected HHG emission from a single atom versus driving laser wavelength for Regime IIIA according to the present invention.

FIG. 18A is a plot showing an example calculation of the expected HHG emission from a single atom versus driving laser wavelength for Regime IIIA according to the present invention. The favorable yield from a single emitter is predicted to scale as $I_L^{-7.5}$ for a bandwidth of a single harmonic and for the conditions in FIG. 18B. This yield is expected to scale more strongly at higher laser intensities.

Figure 18B:
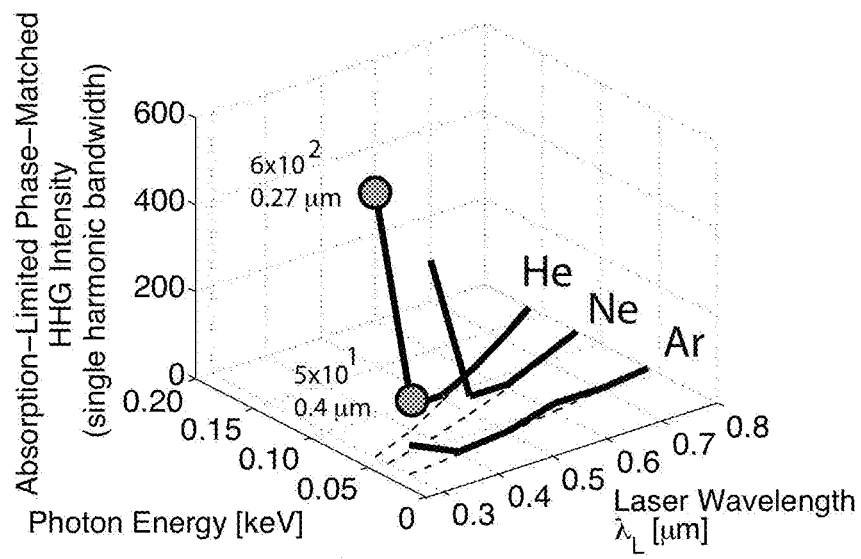
FIG. 18B is a plot showing an example calculation of the expected efficient macroscopic harmonic intensity versus corresponding HHG photon energy and driving laser wavelength for Regime IIIA according to the present invention.

FIG. 18B is a plot showing an example calculation of the expected efficient macroscopic harmonic intensity versus corresponding HHG photon energy and driving laser wavelength for Regime IIIA according to the present invention. Using the method shown in FIG. 21, one can estimate the increase in HHG flux as the laser wavelength is decreased. The illustrated example covers Regime III A where the absorption length is relatively short and full phase matching is possible. This estimates explain the enhanced experimental HHG intensities presented in FIG. 16. Using best estimates of the indices of refraction of the medium one can expect >600 enhancement in macroscopic absorption limited HHG intensity for a 0.27 mm driver and >50 enhancement for a 0.4 mm driver, compared to a phase-matched emission for a 0.8 mm driver. The total enhancement is due to an enhanced, favorable macroscopic phase matching, as well as to a favorable microscopic yield.

Figure 19A:
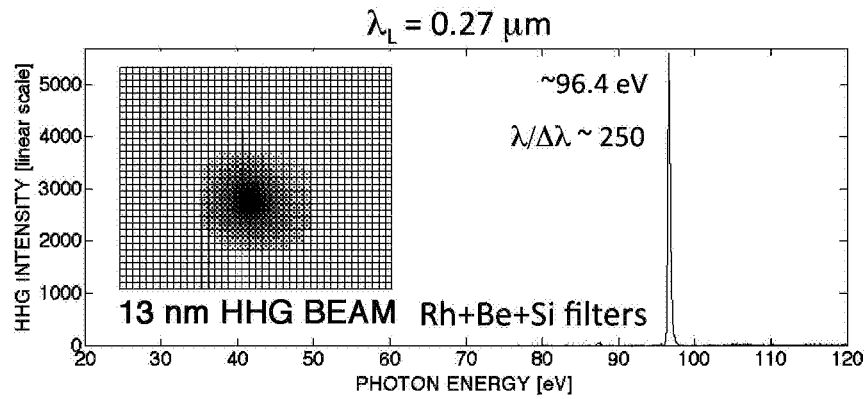
FIG. 19A is a plot showing example experimental data demonstrating beam profile and a bright narrow-band EUV harmonic around 13 nm isolated by a combination of low-pass and high pass thin film filters and by using a specific laser intensity.

FIGS. 19A, B and C illustrate embodiments where isolated single harmonics or few harmonics are generated using a combination of low-pass filters and high-pass filters. This approach is attractive from application point of view since it may reduce the bandwidth requirement or may completely eliminate the need for multilayer VUV-EUV-X-ray mirrors that introduce significant loss to select a single harmonic. Using a few-cycle driving pulse in principle can also result in a spectral supercontinuum corresponding to an isolated VUV, EUV or X-ray pulse.

FIG. 19A is a plot showing example experimental data demonstrating beam profile and a bright narrow-band EUV harmonic isolated by low-pass and high pass thin film filters and by using a specific laser intensity. FIG. 19A demonstrates an isolated, single, 13 nm EUV harmonic (97 eV) with narrow linewidth of $\lambda/\Delta\lambda \sim 250$ or $>350$ meV. The inset shows the 13 nm HHG beam. The adjacent harmonic orders were filtered out using Rh+Si+Be filters of selected thicknesses.

Figure 19B:
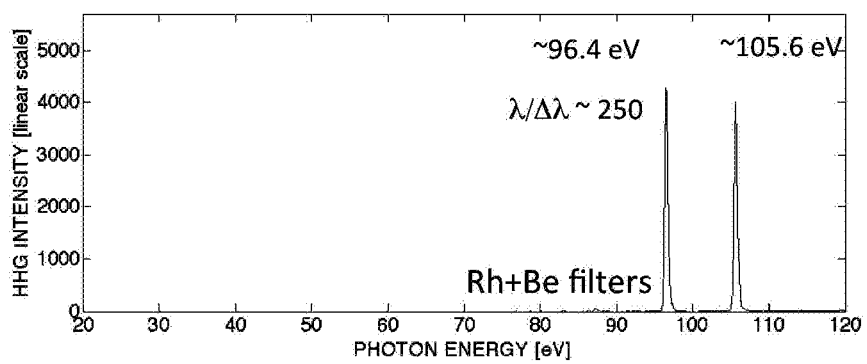
FIG. 19B is a plot showing example experimental data of two bright narrow-band EUV harmonics around 13 nm isolated by a combination of low-pass and high pass thin film filters and by using a specific laser intensity.

FIG. 19B is a plot showing example experimental data demonstrating two isolated, EUV harmonics around 13 nm with narrow linewidths. The adjacent harmonic orders were filtered out using Rh+Be filters of selected thicknesses.

Figure 19C:
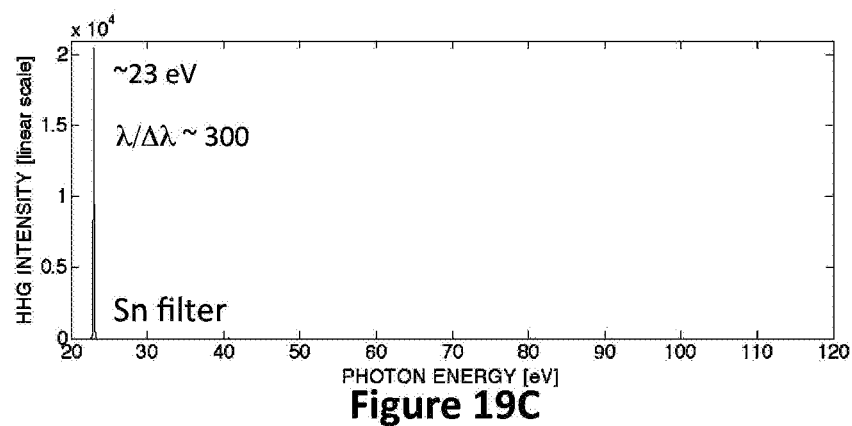
FIG. 19C is a plot showing example experimental data demonstrating a bright narrow-band VUV harmonic isolated by a single low-pass and high pass thin film filter and by using a specific laser intensity.

FIG. 19C is a plot showing example experimental data demonstrating a bright narrow-band VUV harmonic isolated by low-pass and high pass thin film filters and by using a specific laser intensity. The plot demonstrates isolated, single, VUV harmonics around 54 nm (23 eV) with narrow linewidth of $\lambda/\Delta\lambda \sim 300$. The adjacent harmonic orders were filtered out using an Sn filter of selected thickness.

Figure 20A:
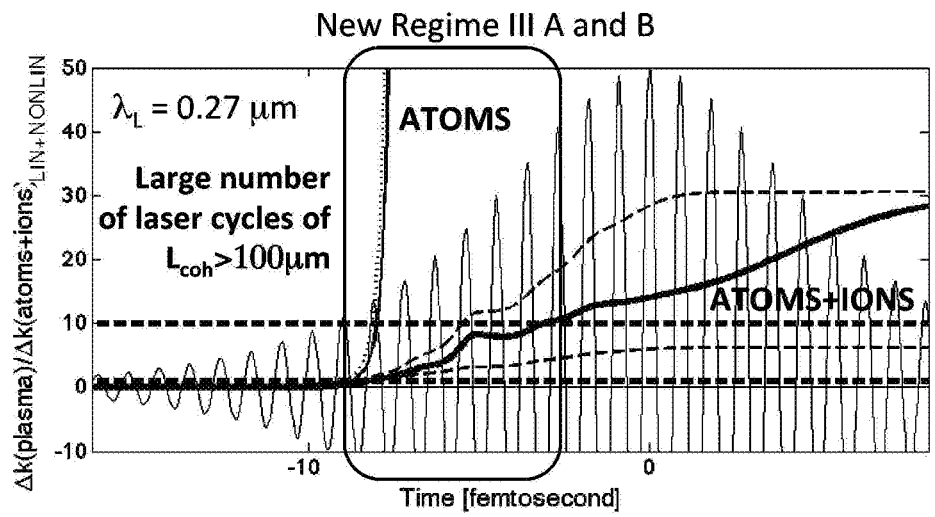
FIG. 20A is a plot showing an example of an extended temporal window of efficient upconversion over a large number of driving laser cycles for Regime III according to the present invention.

FIG. 20A is a plot showing an example of an extended temporal window of efficient upconversion over a large number of driving laser cycles for Regime III according to the present invention.

Figure 20B:
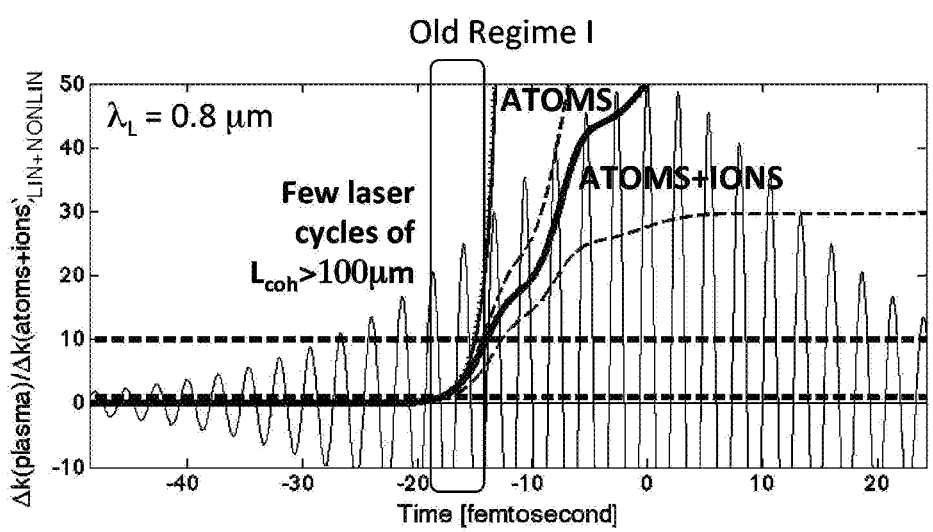
FIG. 20B (Prior Art) is a plot showing an example of a narrow temporal window of upconversion for prior art Regime I.

FIG. 20B (Prior Art) is a plot showing an example of a narrow temporal window of upconversion for prior art Regime I.

Calculated ratio of the dynamic phase mismatch due to plasma and atoms/ions for multi-cycle 0.27 μm and 0.8 μm driving lasers are compared in FIGS. 20A and 20B respectively. In these plots, the highlighted area shows the time window during which HHG emission can be as bright or brighter than the HHG in He driven by 0.8 μm lasers reaching the same photon energy. This time window is larger for UV-driven HHG than for 0.8 μm driven HHG. The dotted lines plot the contributions of neutral atoms alone, while the bold solid lines include both atomic and ionic contributions to the linear and nonlinear indices. The regions enclosed by the dashed lines give the range of values possible: the high values of this ratio exclude the nonlinear indices of refraction of atoms and ions, while the lower values plot a best case scenario, assuming the UV indices of the ions is comparable to that of neutral atoms. The dashed black horizontal lines bracket the same ratios of plasma mismatch and atomic/ionic mismatch.

Figure 21:
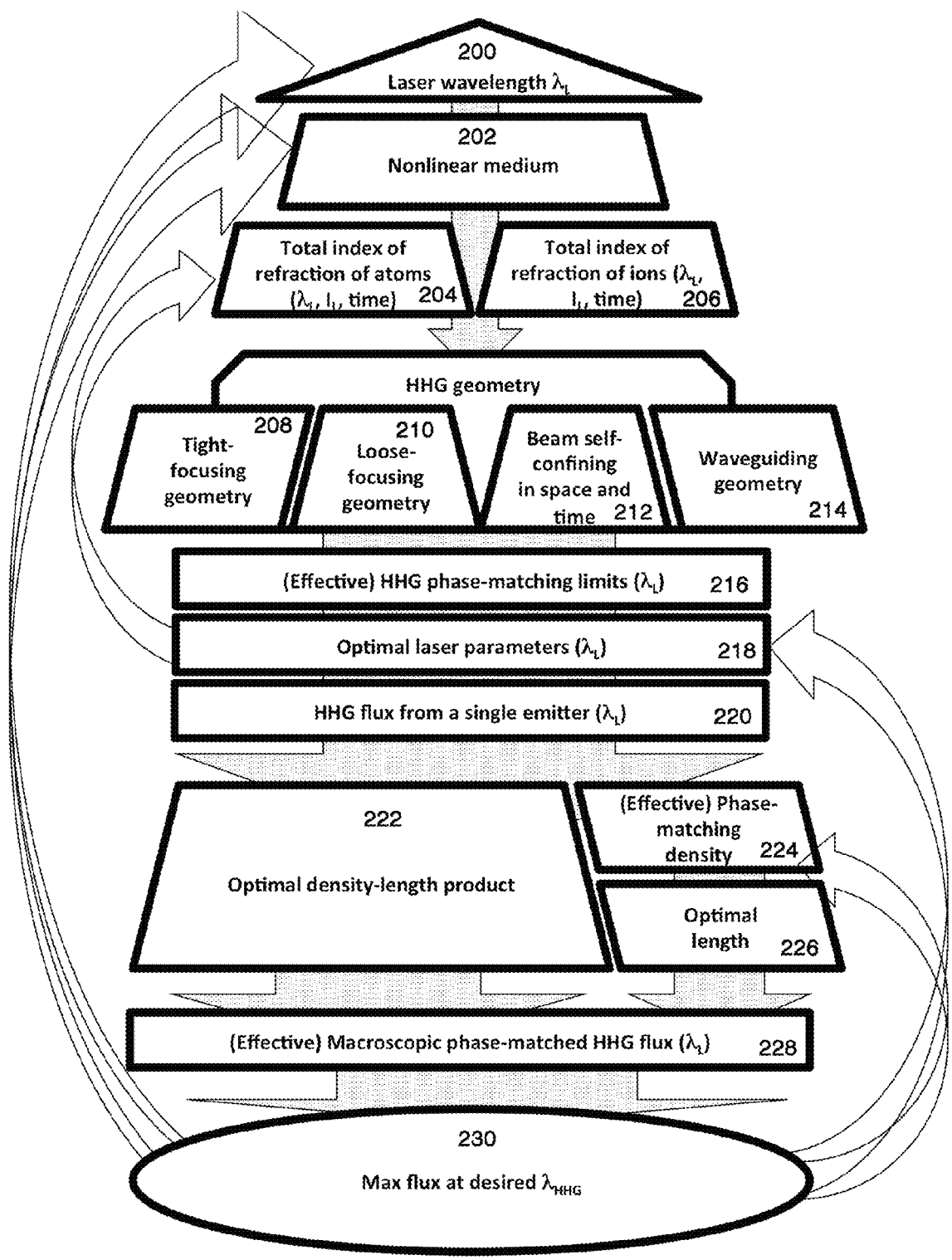
FIG. 21 is a flow diagram illustrating steps in the process of global optimization of HHG with phase matching or effective phase matching according to the present invention, and steps in selecting the optimal parameters for most efficient HHG at a desired HHG wavelength.

FIG. 21 is a flow diagram illustrating steps in the process of global optimization of HHG with phase matching or effective phase matching according to the present invention, and steps in selecting the optimal parameters for most efficient HHG at a desired HHG wavelength.

In step 200, $\lambda_L$ of the driving pulse is chosen. In step X, nonlinear medium is selected. In step 202, the index of refraction of medium consisting of neutral targets and of multiply-charged ionic targets for a range of $\lambda_L$ is computed. The same step now is performed 206 for the nonlinear indices of neutral and ionic targets versus time dependent laser intensity and versus laser wavelength. In the following steps 208, 210, 212, 214, the geometry of the device is chosen. In step 216, the (effective) phase matching limits as a function of $\lambda_L$ are evaluated based on the total index of refraction of the driving laser light, and that of the generated light, for a specific nonlinear medium and a specific laser beam geometry. The same step may optimize the HHG photon energies for which we achieve the same number of HHG photons, i.e. estimating a finite coherence length as a function of the driving laser wavelength that results in a desired number of photons. In step 218, the optimal laser pulse parameters (laser intensity, pulse duration, pulse shape, etc.) are determined. Since the total index of refraction of the neutral and ionic medium is dependent on the laser intensity the indices of refraction of the nonlinear medium may need to be recalculated iteratively. In step 220, the HHG flux from a single emitter as a function of $\lambda_L$ is determined. The generated HHG light in the nonlinear medium can be absorbed by the medium. Thus the monotonic growth of the HHG signal may saturate which sets an optimal density-length product (or number of potential emitters) that can be used. The density-length product is determined by the properties of nonlinear medium. This is the case if the coherence length is greater than the absorption length. If the coherence length is significantly shorter than the absorption length and results is a desired number of photon the selection of the pressure is optimized with respect to an optimal coherence length. For geometries where (effective) phase matching is pressure dependent (for example, waveguide geometries), first optimal pressure is determined and then optimal length, set by the same density-length product. The pressure optimization here may involve minimizing the phase mismatch to achieve a desired $L_{coh}$. Step 228 combines the microscopic, single emitter HHG flux, and the optimization of macroscopic nonlinear medium parameters and laser parameters to get the macroscopic phase-matched HHG flux or number of photons as a function of laser wavelength. Flux can give relative brightness of phase-matched HHG of a desired wavelength for various nonlinear medium, laser wavelengths, etc. Determining the maximum flux or a desired number of photons at a desired HHG wavelength allows proper selection of optimal laser wavelength, optimal nonlinear medium, optimal driving laser pulse parameters, optimal density length product.

While the exemplary preferred embodiments of the present invention are described herein with particularity, those skilled in the art will appreciate various changes, additions, and applications other than those specifically mentioned, which are within the spirit of this invention.

Figure 22:
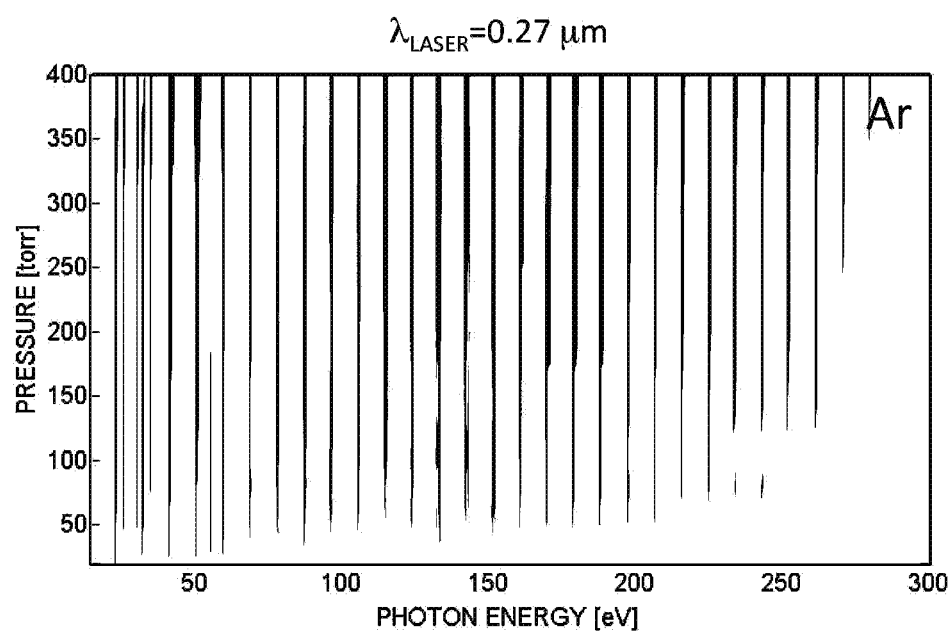
FIG. 22 is a plot showing example experimental data demonstrating pressure optimization of UV-driven HHG spanning the EUV-VUV-X-ray regions of the spectrum for Regime IIIB according to the present invention.

FIG. 22 is experimental data demonstrating optimization of bright X-ray HHG extending up the water window at >280 eV versus pressure for a laser intensity $I_L > 6 \times 10^{15}$ W/cm².

Using a 0.27 μm laser and very high laser intensity $I_L > 6 \times 10^{15}$ W/cm², bright emission from multiply charged Ar ions can extend up to the water window at >280 eV (Regime III B). Note that the optimal pressure increases to above 400 torr for the highest X-ray harmonics. In comparison, using a 0.8 μm laser in Regime I, the optimal pressure for a non-phase matched HHG from multiply charged Ar ions is 2 orders of magnitude lower—~1-5 torr.

Since the coherence length in Regime III increases much slowly with harmonic order and the same photon energy corresponds to a lower harmonic order compared to Regime II, higher optimal pressures can be allowed. As mentioned above, a shorter coherence length in Regime III can lead to a bright HHG emission also because of strong emission from a single atom. Furthermore, as highly charged states are generated during the laser pulse for a specific temporal window the absorption of the medium related to the fully ionized states can be reduced.

What is claimed is:

1. The method of generating coherent emission within the VUV, EUV, and X-ray region of the spectrum comprising the steps of:
    (a) providing a nonlinear medium comprising a gas for high harmonic generation (HHG) of laser light;
    (b) selecting the pressure of the nonlinear medium;
    (c) generating a laser driving pulse having a selected wavelength within the VUV-UV-VIS region of the spectrum and a selected peak intensity above $5 \times 10^{14}$ W/cm$^2$; and
    (d) focusing the driving pulse into the nonlinear medium to cause HHG upconversion resulting in a generated pulse within a selected range within the VUV, EUV, and X-ray region of the spectrum;
wherein steps (a)-(d) effectively phase match the driving pulse and the generated pulse sufficiently to result in a coherent generated pulse wherein the coherence length is comparable to the absorption depth.

2. The method of claim 1 wherein step (c) selects a wavelength and a selected peak intensity of the driving pulse resulting in significant ionization of the nonlinear medium.

3. The method of claim 2 wherein the ionization of the nonlinear medium is at least about 10%.

4. The method of claim 3 wherein the nonlinear medium is fully ionized.

5. The method of claim 3 wherein the nonlinear medium is multiply ionized.

6. The method of claim 5 wherein the ionization of the nonlinear medium exceeds 300%.

7. The method of claim 1 wherein the laser pulse has a wavelength below 0.7 μm.

8. The method of claim 7 wherein the laser pulse has a wavelength of at most about 0.4 μm.

9. The method of claim 7 wherein the laser pulse has a wavelength of at most about 0.27 μm.

10. The method of claim 1 wherein the nonlinear medium is multiply ionized and wherein the coherence length is at least about 1 mm.

11. The method of claim 1 wherein the coherence length is at least about 0.5 cm.

12. The method of claim 1 wherein the medium is one of the following: an atomic gas, a molecular gas, a mixture of atomic gases, a mixture of molecular gases, a mixture of atomic and molecular gases.

13. The method of claim 12 wherein the medium comprises one of the following: He, Ne, Ar, Kr, Xe, H$_2$, air.

14. The method of claim 1 wherein the step of generating a laser pulse generates a pulse having a duration of between 600 attoseconds-1 picosecond and an energy of between 100 μJ and 1 J.

15. The method of claim 1 wherein step (d) generates a pulse having a duration within the femtosecond to zeptosecond range.

16. The method of claim 1 wherein step (d) generates a comb of narrow-band harmonics.

17. The method of claim 16 wherein step (d) generates an isolated harmonic.

18. A method for global flux optimization of coherent harmonic emission at desired wavelength comprising the steps of:
    (a) evaluating a total index of refraction of neutral and ionic species of a medium as a function of the wavelength of a driving laser and evaluating an index of refraction of the corresponding harmonic emission;
    (b) evaluating a total index of refraction of neutral and ionic species of a medium at a laser wavelength as a function of the interaction time between the driving laser pulse and the medium;
    (c) evaluating (effective) HHG phase matching limits as a function of the driving laser wavelength;
    (d) determining optimal laser parameters as a function of the driving laser wavelength;
    (e) evaluating the flux from a single emitter as a function of the driving laser parameters under (effective) phase matching conditions;
    (f) evaluating the optimal density-length product of the medium as a function of the driving laser wavelength;
    (g) combining steps (a)-(f) and calculating the macroscopic (effectively) phase-matched HHG emission as a function of the wavelengths of the generated light and the driving laser light; and
    (h) finding a global maximum of flux at a desired HHG wavelength and selecting an optimal driving laser wavelength, optimal laser pulse parameters, optimal spatial and temporal pulse shape, optimal nonlinear medium and parameters of the nonlinear medium.

* * * * *

UNITED STATES PATENT AND TRADEMARK OFFICE
CERTIFICATE OF CORRECTION

PATENT NO. : 9,627,844 B2
APPLICATION NO. : 15/201736
DATED : April 18, 2017
INVENTOR(S) : Tenio V. Popmintchev et al.

Page 1 of 1

It is certified that error appears in the above-identified patent and that said Letters Patent is hereby corrected as shown below:

In the Specification

In Column 1, Line 10, (before "BACKGROUND OF THE INVENTION") insert the following:
-- This invention was made with government support under grant numbers FA9550-10-1-0561 awarded by the U.S. Air Force; W911NF-13-1-0259 awarded by the U.S. Army Research Office; PHY1068706 awarded by the National Science Foundation; PHY1125844 awarded by the National Science Foundation; and DE-SC0008803 awarded by the U.S. Dept. of Energy. The government has certain rights in the invention. --

Signed and Sealed this
Thirty-first Day of July, 2018

Andrei Iancu
*Director of the United States Patent and Trademark Office*